US012451003B1

(12) United States Patent
Gomez et al.

(10) Patent No.: US 12,451,003 B1
(45) Date of Patent: Oct. 21, 2025

(54) SYSTEMS AND METHODS FOR OPTIMIZING TRAFFIC FLOW BASED ON FUTURE ROADWAY CONDITIONS

(71) Applicant: Cintra US Services, LLC, Austin, TX (US)

(72) Inventors: Ricardo Sanchez Gomez, Austin, TX (US); Alvaro Prieto Moneo, Austin, TX (US); Joseph Charles McKenzie, Austin, TX (US)

( * ) Notice: Subject to any disclaimer, the term of this patent is extended or adjusted under 35 U.S.C. 154(b) by 0 days.

(21) Appl. No.: 19/074,312

(22) Filed: Mar. 7, 2025

(51) Int. Cl.
*G08G 1/01* (2006.01)
*G07B 15/06* (2011.01)

(52) U.S. Cl.
CPC ......... *G08G 1/0129* (2013.01); *G07B 15/063* (2013.01); *G08G 1/0116* (2013.01)

(58) Field of Classification Search
CPC ... G07B 15/063; G08G 1/0129; G08G 1/0116
USPC .......................................................... 701/117
See application file for complete search history.

(56) References Cited

U.S. PATENT DOCUMENTS 5,357,436 A * 10/1994 Chiu ........................ G08G 1/07 340/916
8,548,736 B2 * 10/2013 Chan .................. G01C 21/3492 701/425
9,286,793 B2 * 3/2016 Pan ...................... G08G 1/0112
9,792,575 B2 * 10/2017 Khasis ............... G01C 21/3415
10,380,886 B2 * 8/2019 Ran ...................... G08G 1/0112
11,631,151 B2 * 4/2023 Cella ...................... G06N 3/044 701/1
11,735,035 B2 * 8/2023 Ran ........................ G08G 1/012 701/117
12,046,135 B2 * 7/2024 Jackson ............... G08G 1/0129
2007/0208492 A1 * 9/2007 Downs ................. G08G 1/0129 701/117
2007/0208497 A1 * 9/2007 Downs ................. G08G 1/0104 701/117
2008/0071465 A1 * 3/2008 Chapman ........... G01C 21/3691 701/117
2009/0079586 A1 * 3/2009 Bespalov ............. G08G 1/0104 340/905
2011/0106416 A1 * 5/2011 Scofield .............. G08G 1/0104 701/119

(Continued)

*Primary Examiner* — Luis A Martinez Borrero
(74) *Attorney, Agent, or Firm* — FisherBroyles, LLP; Jeremy P. Sanders

(57) ABSTRACT

Aspects of the disclosed technology relate to a system and methods for optimizing traffic flow along a roadway. The systems receive, from a connected-automated vehicle (CAV), a request for a travel time along a roadway having a managed lane and a general purpose lane. The system determines real-time traffic data, and using a trained machine learning model, predicts future traffic data along the roadway, determines a time saved by using the managed lane, communicates with the CAV, receives an acknowledgement that the vehicle will use the managed lane, and updates the predicted traffic data. Segment agents may be responsible for discrete segments of the roadway and may communicate with a coordination agent to result in a multi-agent reinforced traffic machine learning system. The system provides a mobility service to CAVs by implementing a reinforcement learning process to understand CAV behavior to optimize and maintain the service level along a roadway.

10 Claims, 13 Drawing Sheets

(56) References Cited

U.S. PATENT DOCUMENTS

2013/0099942 A1* 4/2013 Mantalvanos ......... G08G 1/082 340/910
2015/0268056 A1* 9/2015 Gueziec ............. G08G 1/09675 701/117
2017/0084172 A1* 3/2017 Rolle ................... G08G 1/0129
2017/0195953 A1* 7/2017 Amorim de Faria Cardote .......... H04W 52/0212
2017/0262790 A1* 9/2017 Khasis ............... G01C 21/3415
2017/0323249 A1* 11/2017 Khasis ................. G08G 1/0145
2018/0096595 A1* 4/2018 Janzen ................... G06V 10/94
2018/0108251 A1* 4/2018 Macfarlane .......... G08G 1/0129
2018/0190111 A1* 7/2018 Green .................... G08G 1/052
2018/0211523 A1* 7/2018 Ashida ................. G08G 1/0141
2018/0286221 A1* 10/2018 Khokhlov ........ G08G 1/096811
2018/0336780 A1* 11/2018 Ran ...................... G08G 1/0129
2019/0096238 A1* 3/2019 Ran ........................ G08G 1/164
2019/0204100 A1* 7/2019 Sharma .................. G08G 1/012
2019/0244521 A1* 8/2019 Ran .......................... G08G 1/22
2019/0310100 A1* 10/2019 Yang .................. G01C 21/3461
2020/0005633 A1* 1/2020 Jin ........................ H04W 12/02
2020/0042799 A1* 2/2020 Huang ................. G06V 10/764
2020/0151291 A1* 5/2020 Bhattacharyya ....... G01C 21/20
2020/0193815 A1* 6/2020 Zheng .................. G08G 1/0145
2020/0334979 A1* 10/2020 Gonçalves ........... G08G 1/0129
2021/0005085 A1* 1/2021 Cheng .................... G08G 1/164
2021/0065074 A1* 3/2021 Torrealba Fuenzalida .................. G08G 1/0125
2021/0065551 A1* 3/2021 Manohar ................ G08G 1/167
2022/0126864 A1* 4/2022 Moustafa .............. B60W 50/14
2022/0319312 A1* 10/2022 Mintz ................ G06Q 30/0224
2022/0327925 A1* 10/2022 Jackson ............... G08G 1/0175
2022/0375340 A1* 11/2022 Pittman .................. G06N 20/00
2022/0383750 A1* 12/2022 Sharma Banjade ... G08G 1/005
2022/0388505 A1* 12/2022 Sharma Banjade ......................... G08G 1/096783
2023/0095384 A1* 3/2023 Sharma Banjade ......................... G08G 1/096725 701/301
2023/0206753 A1* 6/2023 Xu ......................... G08G 1/052 701/119
2023/0298468 A1* 9/2023 Jha ......................... G08G 1/164 701/117
2023/0300579 A1* 9/2023 Merwaday .............. B60L 53/67 701/423
2023/0377460 A1* 11/2023 Sivanesan .............. G08G 1/143
2023/0396958 A1* 12/2023 Lund ..................... H04W 4/029
2023/0401953 A1* 12/2023 Littlejohn ............ G08G 1/0112
2024/0416950 A1* 12/2024 Zeiynali Farid ..... G08G 1/0116
2025/0131819 A1* 4/2025 Yuan ..................... B60W 50/16

* cited by examiner

300

SYSTEMS AND METHODS FOR OPTIMIZING TRAFFIC FLOW BASED ON FUTURE ROADWAY CONDITIONS

TECHNICAL FIELD

The present invention relates to systems, methods, and computer readable storage media containing instructions for detecting anomalous traffic conditions and predicting future roadway conditions for connected-automated vehicles (CAVs). Some embodiments further relate to calculating a decision in response to the detection or prediction of roadway conditions and communicating with connected-automated vehicles.

BACKGROUND

Dynamically priced toll lanes, also known as managed lanes or high-occupancy toll (HOT) lanes, adjust toll rates in real-time based on current and future traffic conditions. By varying the toll rates, these lanes aim to maintain a consistent speed and ensure smoother traffic flow. They use advanced traffic monitoring systems to collect real-time data on traffic volumes, speeds, and congestion levels. These systems also use predictive algorithms which combine historical data and machine learning models to forecast future traffic conditions and adjust toll rates accordingly. By dynamically adjusting toll rates, these algorithms help maintain a steady flow of traffic, reducing delays and improving overall travel times.

However, broader issues hinder the effectiveness of current traffic optimization technologies. Many traffic management systems rely on siloed data sources, preventing comprehensive analysis and coordination across different segments of the freeway. Real-time data collection is often nonexistent, insufficient or inaccurate, leading to suboptimal decisions. Current traffic technologies often use predefined algorithms that cannot adapt to unexpected changes in traffic conditions, such as accidents, weather, or special events. Roadways are not always equipped with the necessary sensors, cameras, or communication networks to support real-time, large-scale traffic management. Existing technologies often fail to accommodate the increasing complexity of mixed traffic, including human-driven and connected-automated vehicles.

Current traffic optimization technologies, while effective in some specific scenarios, suffer technical limitations and do not take advantage of new and advance vehicle technologies. For instance, vehicles are now equipped with communication connectivity that enable them to send and receive information in limitless ways, combining this with automated driving systems or full autonomy as in the case of robotaxis create “cooperative” opportunities that can meet the needs of both the driver or customer and the traffic operator.

Furthermore, toll road operators continually analyze customer behaviors to better understand pricing strategies, the relation to traffic conditions and the “capture rate” which is the frequency in which drivers choose to take a managed lane. This analysis informs future strategies that could be taken to influence customers and maximize the usage of the managed lane’s capacity. These analyses are performed retroactively and do not utilize the advantages of real-time communications with connected-automated vehicles that would enable customized incentivization through reinforcement learning techniques.

What is needed, therefore, is a system and method that understands real-time traffic information, predicts future traffic conditions and can communicate information with connected-automated vehicles. The system should learn and anticipate connected-automated vehicle behaviors, preferences and better control the future traffic conditions of managed lanes and the unmanaged or general-purpose lanes within a facility. These, and other benefits, will be readily apparent to those of skill in the art in reference to the following disclosure which provides technical solutions to these, and other, issues.

SUMMARY

To address the above-identified shortcomings, technical solutions focus on integrating real-time data, predictive analytics, and adaptive algorithms, as well as fostering coordination among systems and jurisdictions. The proposed embodiments are directed at overcoming these challenges and result in improving freeway efficiency, reducing congestion, and accommodating connected-automated vehicles and smart city ecosystems.

According to some embodiments, a traffic optimization system includes a plurality of real-time roadway sensors including one or more of lidar sensors, radar sensors, infrared sensors, microwave sensors, optical sensors, and doppler sensors, the plurality of real-time roadway sensors disposed along a roadway having a plurality of segments, each segment having a managed lane and a non-managed lane, wherein the plurality of real-time roadway sensors are configured to determine real-time traffic data comprising vehicle count, speed, volume, and density associated with each of the plurality of segments; a traffic database storing historical traffic data for the plurality of segments of the roadway; a network interface configured to receive a route request from a connected-automated vehicle, the route request including a starting point, a destination, a route along the roadway from the starting point to the destination, and an estimated time of arrival at an entry point of the managed lane; a future traffic conditions prediction server comprising a memory and a processor executing instructions stored in the memory, the instructions causing the processor to: receive, via the network interface, the route request from the connected-automated vehicle; retrieve, from the traffic database, historical traffic data associated with the route at the estimated time of arrival at the entry point of the managed lane; receive, from the plurality of real-time roadway sensors, real-time traffic data for the route; input the historical traffic data, the real-time traffic data, and the estimated time of arrival into a machine learning model trained on historical patterns to predict future traffic conditions; predict, using the machine learning model, an estimated travel time for the managed lane and the non-managed lane along the route at the estimated time of arrival; determine, based on the estimated travel times, a time savings for traveling in the managed lane; transmit, via the network interface, the estimated travel time for the managed lane, the estimated travel time for the non-managed lane, and the time savings to the connected-automated vehicle; receive, via the network interface, an acceptance from the connected-automated vehicle to travel in the managed lane; update the machine learning model with the acceptance from the connected-automated vehicle; and predict, using the updated machine learning model, future estimated travel times for additional connected-automated vehicles; a plurality of segment agents, each segment agent associated with one of the plurality of roadway segments, wherein each segment agent is configured to monitor real-time traffic data from roadway sensors in its associated roadway segment and communicate the real-time traffic data to the future traffic conditions prediction server; and a coordination agent in communication with each of the plurality of segment agents, the coordination agent configured to generate and transmit instructions to each segment agent to control traffic flow in the managed and non-managed lanes based on the predicted future estimated travel times from the future traffic conditions prediction server.

The traffic optimization system may be further configured to receive historical traffic data for the plurality of segments of the roadway, the historical traffic data including traffic speed, traffic density, and managed lane acceptance data; vectorize the historical traffic data into a plurality of vectors, each vector corresponding to a single time interval for one of the plurality of segments; identify anomalous vectors within the plurality of vectors using an isolation forest anomaly detection algorithm, wherein each anomalous vector represents a time interval where traffic conditions significantly deviate from normal conditions; and cluster the anomalous vectors into a plurality of anomalous vector clusters using a clustering algorithm, wherein each anomalous vector cluster represents a group of similar anomalous traffic conditions.

In some cases, the instructions further cause the processor to determine, for each anomalous vector cluster, an anomaly type based on the traffic conditions represented by the vectors in the cluster; and associate an adjustment factor with each anomaly type, the adjustment factor indicating how to adjust the estimated travel times predicted by the machine learning model when the real-time traffic data matches that anomaly type.

The instructions may further cause the processor to vectorize the real-time traffic data received from the plurality of real-time roadway sensors into a real-time traffic vector; compare the real-time traffic vector to each of the anomalous vector clusters to determine if the real-time traffic data is anomalous; if the real-time traffic vector is anomalous, identify the anomaly type based on the matching anomalous vector cluster; and adjust the estimated travel times predicted by the machine learning model using the adjustment factor associated with the identified anomaly type prior to transmitting the estimated travel times to the connected-automated vehicle.

In some cases, the future traffic conditions prediction server is further configured to receive, via the network interface, actual travel time data from each connected-automated vehicle that accepted travel in a managed lane; compare the actual travel time data to the predicted estimated travel times; and further update the machine learning model based on the comparison to improve future predictions.

Each of the segment agents may be further configured to store historical acceptance data for connected-automated vehicles that have traveled through the agent's associated roadway segment; analyze the historical acceptance data to identify patterns of managed lane usage by individual connected-automated vehicles; and generate targeted incentives for transmission to the individual connected-automated vehicles based on the identified patterns to further encourage managed lane usage.

In some cases, the targeted incentives are customized based on factors including one or more of a connected-automated vehicle's historical managed lane usage frequency, time of day, day of week, holiday designation, vehicle occupancy, or vehicle type.

The future traffic conditions prediction server may be further configured to receive, via the network interface, navigation data from the connected-automated vehicle indicating a change in the connected-automated vehicle's route after accepting travel in the managed lane; and further update the machine learning model based on the navigation data to improve future predictions.

In some embodiments, the coordination agent is further configured to monitor real-time and historical managed lane usage data across all the roadway segments; and dynamically adjust the instructions transmitted to one or more of the segment agents based on the real-time and historical managed lane usage data to balance managed lane usage across the plurality of roadway segments.

According to some embodiments, a traffic optimization system includes one or more real-time roadway sensors including one or more of lidar, radar, infrared, microwave, optical, or doppler sensors, the one or more real-time roadway sensors disposed along a first section of roadway and configured to determine vehicle count, speed, volume, and density associated with the first section of roadway; and a future traffic conditions prediction server, the future traffic conditions prediction server configured to receive a request from a connected-automated vehicle for a travel time along a first route, the first route including a managed lane and a non-managed lane, and a time of arrival at the managed lane; receive, from the one or more real-time roadway sensors disposed along the first route, current traffic conditions comprising vehicle count, speed, volume, and density associated with the first route; receive, from a traffic database, past traffic conditions associated with the first route at the time of arrival at the managed lane; execute a trained machine learning model; enter, into the trained machine learning model, input features comprising one or more of current traffic conditions, past traffic conditions, weather conditions, and the time of arrival at the managed lane; determine, by the trained machine learning model, an estimated travel time along the managed lane at the time of arrival at the managed lane; send, to the vehicle, the estimated travel time along the managed lane at the time of arrival at the managed lane and an indication of time saved by accepting the managed lane over the non-managed lane; receive, from the connected-automated vehicle, an acceptance of the managed lane; determine, based on the acceptance of the managed lane, an updated future traffic conditions for the first section of roadway; and display, on a roadway sign, indicia associated with an incentive to enter the managed lane.

The traffic optimization system may include an on ramp to the first section of roadway, the on ramp including one or more sensors including one or more of radar detectors, automatic license plate readers, radio-frequency identification (RFID) tag readers, and Bluetooth readers, the one or more sensors configured to determine a number of vehicles entering the first section of roadway by the on ramp and sending, to the future traffic predictions server, the number of vehicles entering the first section of roadway.

In some cases, the traffic optimization system further includes a first segment agent and a coordination agent, the first segment agent configured to monitor the current traffic conditions present in the first section of roadway and provide, to the coordination agent, the current traffic conditions.

The traffic optimization system may further include a second segment agent configured to monitor the current traffic conditions present in a second segment of the roadway, and receive, from the coordination agent, instructions for managing the traffic in the second segment of the roadway.

In some examples, the instructions further cause the processor to identify connected-automated vehicles that consistently accept and use the managed lanes; categorize the identified connected-automated vehicles as frequent users; and transmit, via the network interface, exclusive incentives to the frequent users, the incentives including one or more of guaranteed pricing, personalized route recommendations, or partner discounts.

According to some embodiments, a machine learning method includes the steps of receiving, from a connected-automated vehicle, a request for a travel time along a first route, the first route including a managed lane and a non-managed lane; determining, in response to the request for the travel time along the first route, a first travel time associated with the non-managed lane and a second travel time associated with the managed lane; receiving, from one or more sensors disposed along the first route, real-time roadway traffic data, the roadway traffic data including one or more of a traffic speed and a traffic density; receiving, from a traffic database, historical data of travel times along the first route; receiving, from the connected-automated vehicle, an estimated travel time for the route; determining, by executing a machine learning model and based at least in part on the real-time roadway traffic data and the historical data, an estimated future traffic prediction for the route; determining, based on the estimated future traffic prediction for the route, a predicted travel time along the route; determining, based on the predicted travel time along the route, that the managed lane results in a travel time savings; sending, to the connected-automated vehicle, data associated with the managed lane, including the travel time savings and a cost associated with the managed lane; and receiving, from the connected-automated vehicle, an indication that the connected-automated vehicle will travel along the managed lane.

The method may include the step of determining, based on the estimated future traffic prediction, an incentive for a second connected-automated vehicle to accept the managed route. In some cases, the incentive comprises dynamically setting a toll price.

The machine learning method may include the step of training the machine learning model on ground truth data, the ground truth data including the time saved and the cost associated with the managed route and the indication that the connected-automated vehicle will travel along the managed lane.

The machine learning method may include determining an actual travel time of the connected-automated vehicle along the route and comparing the actual travel time to the predicted travel time. The method may further include training the machine learning model based on comparing the actual travel time to the predicted travel time.

According to some embodiments, a machine learning method includes the steps of receiving a request from a connected-automated vehicle; executing a trained machine learning model; providing input features to the machine learning model associated with the request from the connected-automated vehicle, the input features comprising: a route of travel for the connected-automated vehicle, the route of travel including a managed lane and a non-managed lane; real-time traffic sensor data from one or more of lidar, radar, infrared, microwave, optical, or doppler sensors disposed along the route of travel, the real-time traffic sensor data including one or more of a traffic speed and a traffic density; and historical data of travel times along the route; predicting, by the machine learning model, an estimated future traffic prediction for the route during a time block; predicting, by the machine learning model, an estimated travel time along the route for the managed lane and the non-managed lane during the time block; returning, to the connected-automated vehicle the estimated travel time along the route for the managed lane and the non-managed lane; receiving, from the connected-automated vehicle, an acceptance of the route of travel including the managed lane; and providing the acceptance of the route of travel including the managed lane to the machine learning model for use in subsequent estimated future traffic predictions.

According to some embodiments, a traffic optimization system includes a plurality of real-time roadway sensors including one or more of lidar sensors, radar sensors, infrared sensors, microwave sensors, optical sensors, and doppler sensors, the plurality of real-time roadway sensors disposed along a roadway having a plurality of segments, each segment having a managed lane and a non-managed lane, wherein the plurality of real-time roadway sensors are configured to determine real-time traffic data comprising vehicle count, speed, volume, and density associated with each of the plurality of segments; a traffic database storing historical traffic data for the plurality of segments of the roadway; a network interface configured to receive a route request from a connected-automated vehicle, the route request including a starting point, a destination, a route along the roadway from the starting point to the destination, and an estimated time of arrival at an entry point of the managed lane; a future traffic conditions prediction server comprising a memory and a processor executing instructions stored in the memory, the instructions causing the processor to: receive, via the network interface, the route request from the connected-automated vehicle; retrieve, from the traffic database, historical traffic data associated with the route at the estimated time of arrival at the entry point of the managed lane; receive, from the plurality of real-time roadway sensors, real-time traffic data for the route; input the historical traffic data, the real-time traffic data, and the estimated time of arrival into a machine learning model trained on historical patterns to predict future traffic conditions; predict, using the machine learning model, an estimated travel time for the managed lane and the non-managed lane along the route at the estimated time of arrival; determine, based on the estimated travel times, a time savings for traveling in the managed lane; transmit, via the network interface, the estimated travel time for the managed lane, the estimated travel time for the non-managed lane, and the time savings to the connected-automated vehicle; receive, via the network interface, an acceptance from the connected-automated vehicle to travel in the managed lane; update the machine learning model with the acceptance from the connected-automated vehicle; and predict, using the updated machine learning model, future estimated travel times for additional connected-automated vehicles; a plurality of segment agents, each segment agent associated with one of the plurality of roadway segments, wherein each segment agent is configured to monitor real-time traffic data from roadway sensors in its associated roadway segment and communicate the real-time traffic data to the future traffic conditions prediction server; and a coordination agent in communication with each of the plurality of segment agents, the coordination agent configured to generate and transmit instructions to each segment agent to control traffic flow in the managed and non-managed lanes based on the predicted future estimated travel times from the future traffic conditions prediction server. It should be appreciated that many of the components, features, methods, and benefits can be used with any of the embodiments described herein in various combinations to tailor a specific system and method to a particular roadway or series of roadways.

Aspects of the presently disclosed technology further include computing systems configured to perform these methods, and computer-readable storage media for performing these methods. The presently disclosed technology is not, however, limited to only these features, and includes such other features and embodiments as are described herein.

BRIEF DESCRIPTION OF THE DRAWINGS

Included in the present specification are figures which illustrate various embodiments of the present disclosed technology. As will be recognized by a person of ordinary skill in the art, actual embodiments of the disclosed technology need not incorporate each and every component illustrated, but may omit components, add additional components, or change the general order and placement of components. Reference will now be made to the accompanying figures and flow diagrams, which are not necessarily drawn to scale, and wherein.

DETAILED DESCRIPTION

Figure 1:
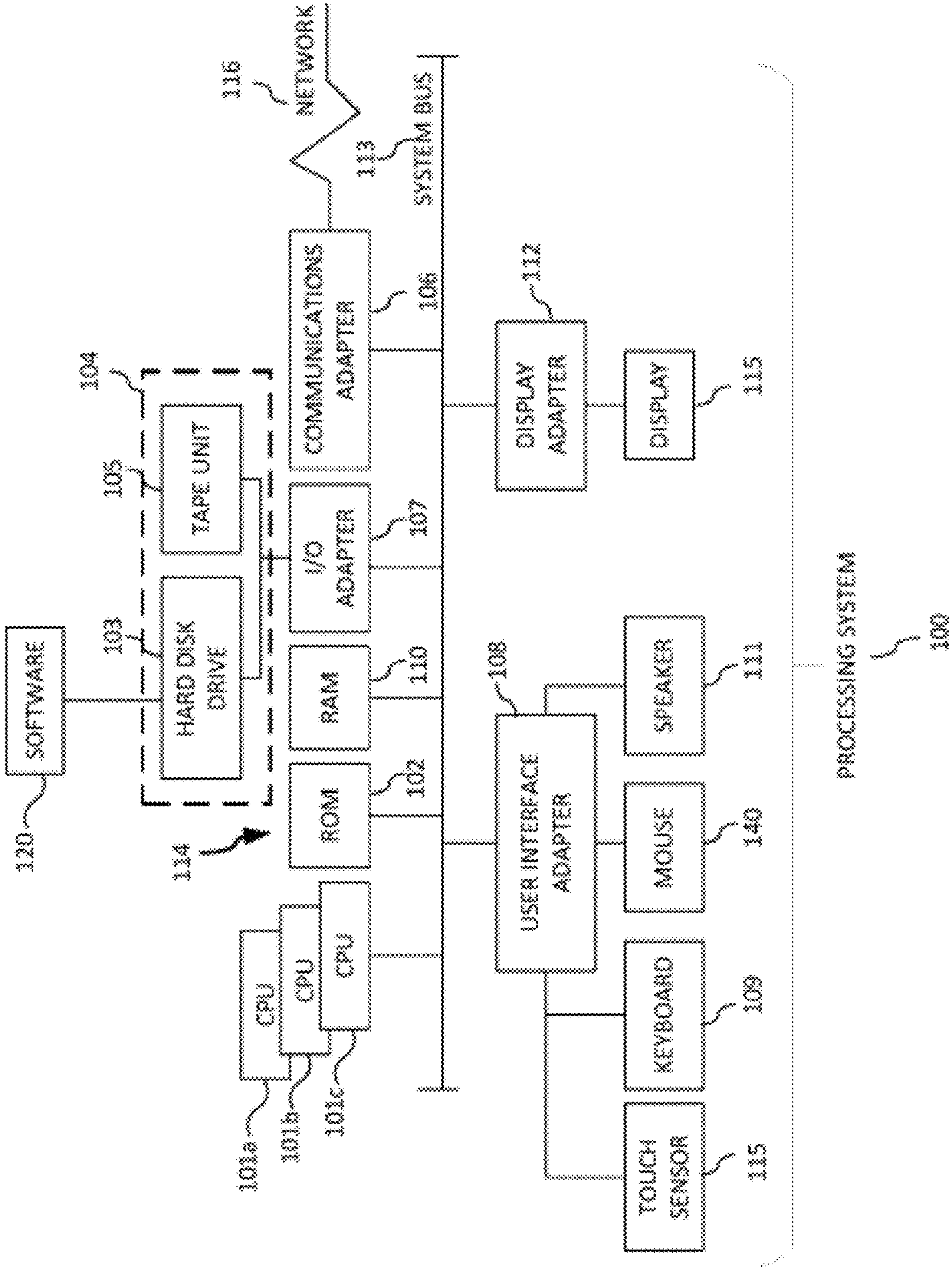
FIG. 1 depicts a computing device in accordance with some embodiments.

The following detailed description is directed to machine learning systems, methods, and computer-readable media for determining and predicting current and future roadway conditions and communicating with connected-automated vehicles in response to queries related to the current and future roadway conditions.

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method or process does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

Various products and services provided by third parties are mentioned as example components of embodiments in accordance with the disclosed technologies. The use of trademarked (registered or common-law) names are intended for descriptive purposes only—no claim of ownership over the terms is asserted by the applicants. Further, the mention of a trademarked product or service is as an example only. Other products and services providing equivalent functions, whether commercial, open-source, or custom-developed to support embodiments are contemplated in accordance with the disclosed technology.

Referring now to FIG. 1, there is shown an embodiment of a processing system 100 for implementing the teachings herein. In this embodiment, the processing system 100 has one or more central processing units (processors) 101*a*, 101*b*, 101*c*, etc. (collectively or generically referred to as processor(s) 101). Processors 101, also referred to as processing circuits, are coupled to system memory 114 and various other components via a system bus 113. Read only memory (ROM) 102 is coupled to system bus 113 and may include a basic input/output system (BIOS), which controls certain basic functions of the processing system 100. The system memory 114 can include ROM 102 and random access memory (RAM) 110, which is read-write memory coupled to system bus 113 for use by processors 101.

FIG. 1 further depicts an input/output (I/O) adapter 107 and a network adapter 106 coupled to the system bus 113. I/O adapter 107 may be a small computer system interface (SCSI) adapter that communicates with a hard disk (magnetic, solid state, or other kind of hard disk) 103 and/or tape storage drive 105 or any other similar component. I/O adapter 107, hard disk 103, and tape storage drive 105 are collectively referred to herein as mass storage 104. Software 120 for execution on processing system 100 may be stored in mass storage 104. The mass storage 104 is an example of a tangible storage medium readable by the processors 101, where the software 120 is stored as instructions for execution by the processors 101 to implement a circuit and/or to perform a method. Network I communications adapter 106 interconnects system bus 113 with an outside network 116 enabling processing system 100 to communicate with other such systems. A screen (e.g., a display monitor) 115 is connected to system bus 113 by display adapter 112, which may include a graphics controller to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 140, and speaker 111 can be interconnected to system bus 113 via user interface adapter 108, which may include, for example, a Super I/O chip integrating multiple device adapters into a single integrated circuit.

Thus, as configured in FIG. 1, processing system 100 includes processing capability in the form of processors 101 and storage capability including system memory 114 and mass storage 104, input means such as a keyboard 109, mouse 140, or touch sensor 115 (including touch sensors 109 incorporated into displays 115), and output capability including speaker 111 and display 115. In one embodiment, a portion of system memory 114 and mass storage 104 collectively store an operating system to coordinate the functions of the various components shown in FIG. 1.

Figure 2:
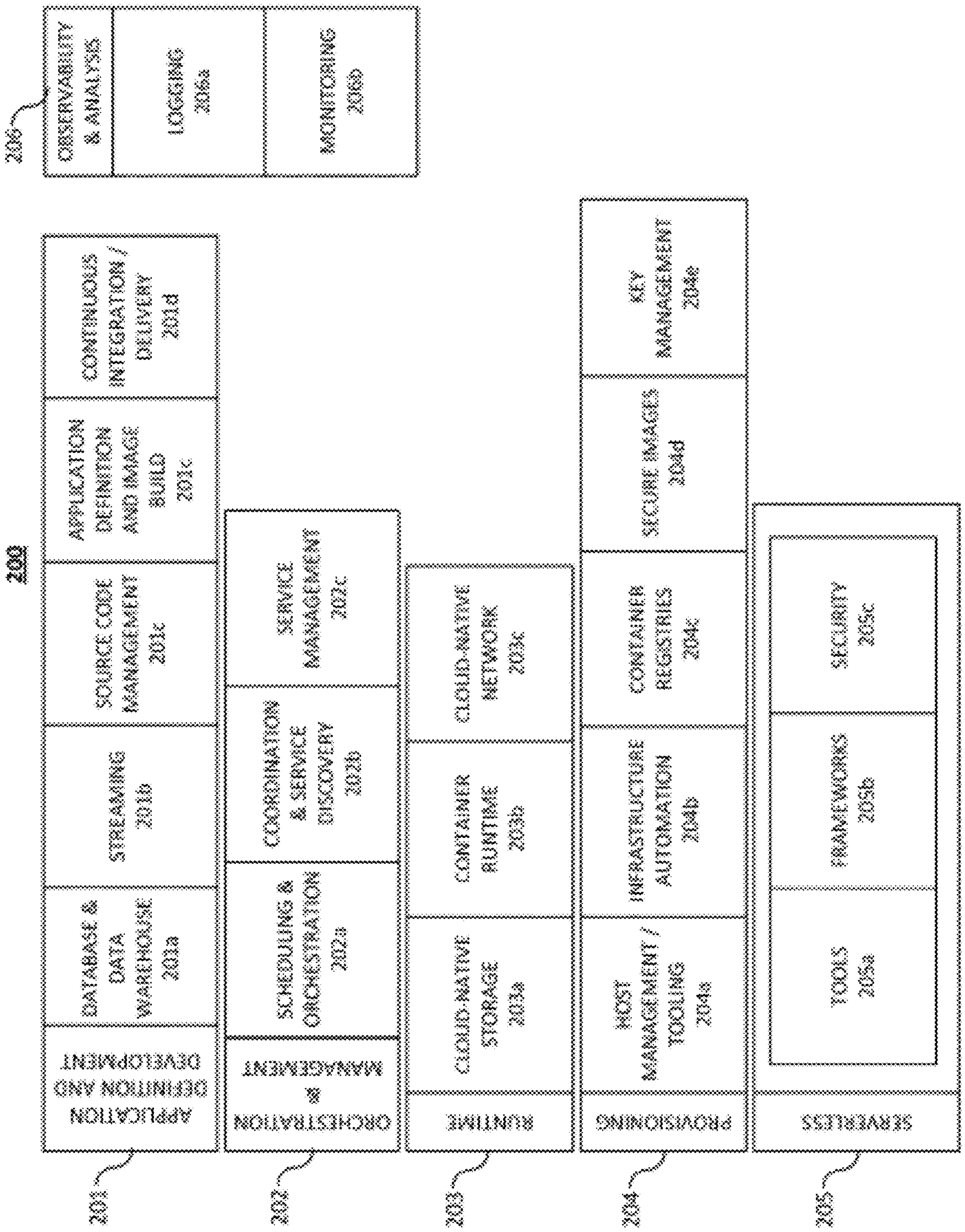
FIG. 2 depicts a cloud computing environment in accordance with some embodiments.

Embodiments of the present technology can also be implemented using cloud-based technologies, such as those depicted in FIG. 2. Cloud native technologies include scalable applications in modem, dynamic environments such as public, private, and hybrid clouds. Containers, service meshes, microservices, immutable infrastructure, and declarative APIs exemplify this approach. These techniques enable loosely coupled systems that are resilient, manageable, and observable.

Embodiments of the disclosed technology can be built using one or more elements of cloud computing technology as shown in FIG. 2. Cloud technologies can include application definition and development tools 201, orchestration & management tools 202, runtime tools 203, provisioning tools 204, serverless components 205, and observability & analysis tools 206.

Application definition and development components 201 ("ADD") enable developers to define and develop applications prior to deployment, and to refine those designs in subsequent versions. ADD components 201 can include database and data warehouse components 201*a* that provide data sets and data storage for application development. These database and data warehouse components 201*a* include relational and non-relational data stores, graph databases, flat files, and other data storage technologies. ADD components 201 can further include streaming components 201*b* that facilitate rapid distribution of data to numerous system endpoints, such as message queues, stream processing software, and other data distribution systems. ADD components 201 can further include source code management components 201*c*, such as Git, Mercurial, Subversion, and other similar source management systems. Source code management components 201c can also include cloud-based servers for version control, such as GitHub or GitLab. ADD components 201 can further include application definition and image build components 201*c* that allow developers to define cloud-based infrastructure, including configurations of application servers, software defined networks, and containerized services. ADD components 201 can further include continuous integration and continuous delivery (CI/CD) components 201*d* that automate the process of application testing and deployment. CI/CD components 201*d* can be configured to automatically run automated tests on application software (e.g., when a change is committed to a version control platform), and if the tests are successful, to deploy the application software to a production environment.

Orchestration and management ("OM") components 202 facilitate the containerization and subsequent coordinated execution of application software. OM components 202 include scheduling and orchestration components 202*a* that schedule and run containerized software. Non-limiting examples of scheduling and orchestration components 202*a* include Kubernetes and Docker Swarm. OM components 202 can further include coordination and service discovery components 202*b* that allow software to automatically discover cloud-based resources, such as data stores, data streaming sources, etc. OM components can further include service management components 202*c* that can include load balancers, reverse proxy systems, auto scalers, and other components that facilitate autonomous or manual application scaling.

Runtime components 203 can include basic environments to support execution of cloud-based application software. Runtime components 203 can include cloud-native storage 203*a*, such as object stores, virtual file systems, block storage, and other forms of cloud-centric data storage. Runtime components 203 can include container runtimes 203*b* that provide the foundation for containerized application software, such as Docker or Rkt. Runtime components 203 can further include cloud-native network components 203*c* that provide software-defined networking and virtual private cloud technologies that enable components of cloud-based systems to communicate with each other, as well as with the wider Internet.

Provisioning components 204 can include components intended for configuring cloud components and triggering the creation of cloud resources on various cloud platforms. Provisioning components can include Host Management and Tooling components 204*a* that define and deploy configurations of cloud components when executed. Provisioning components 204 can further include infrastructure automation components 204*b* that automate basic cloud infrastructure tasks. Provisioning components 204 can further include container registries 204*c* that provide storage for containerized cloud applications that are deployable by other provisioning components. Provisioning components can further include secure image components 204*d* that provide security and verification for container images to ensure consistent and reliable deployment of trusted container images. Provisioning components can further include key management systems 204*e* that provide for secure storage of cryptographic keys.

Serverless components 205 can include components for deploying cloud applications that do not rely upon a continuously running (or scheduled) runtime execution, but instead run discrete components of functionality given a condition. Serverless components 205 can include components 205*a* to simplify the development of serverless applications, such as components that convert server-centric software into serverless code, event simulators, and simulations of cloud-based serverless platforms. Serverless components 205 can also include frameworks 205*b* that are predefined systems that take code in certain configurations and deploy them as serverless applications in cloud environments. Serverless components 205 can also include security components 205*c* that help to secure serverless applications.

Observability & Analysis components ("O&A") 206 can include systems for monitoring running cloud applications, detecting and observing defects and errors, and logging system performance. O&A components 206 can include monitoring components 206*a* that monitor running systems to display and/or record performance metrics, error rates, and other application data. O&A components 206 can also include logging components 206*b* that collect system logs from cloud-based components and aggregate them in a single place or to a single access point to review system performance. O&A components 206 can also include tracing components 206*c* that collect detailed trace logs when cloud components run into errors, system exceptions, and other problematic behaviors to assist in the identification and remediation of problems in cloud-based systems.

In some embodiments, one or more methods are embodied in a set of instructions for one or more processors having access to one or more types of memory. The instructions could be coded in hardware or in software. Many kinds of platforms may be used, including, but not limited to: computers, mobile devices, tablets, game consoles, network management devices, field-programmable gate arrays, and cloud-based computer systems. Aspects of the disclosure could be deployed on multiple devices for concurrent operation. Embodiments may be used as a component of a larger system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In some embodiments, the computer readable medium can be a non-transitory storage system on a cloud platform, such as, for example, in a database or data warehouse component 201*a*, a source code management tool 201*c*, cloud-native storage component 203*a*, embodied in a container image stored locally or in a container registry 204*c*, or deployed in a container runtime 203*b*. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to wireless, wireline, optical fiber cable, RF, etc., or any suitable combination of the foregoing.

Computer program code for carrying out operations for aspects of the present invention may be written in any combination of one or more programming languages, including languages such as Java, Python, Go, Ruby, JavaScript, Smalltalk, C++ or the like. As defined herein, computer program code also includes the build artifact of any of the above languages, or similar languages and environments, such as object code, byte- or word-code, or other compiled, interpreted, or processed code. The program code may execute entirely on the user's computer, partly on the user's computer, as a stand-alone software package, partly on the user's computer and partly on a remote computer or entirely on one or more remote computers, servers, or serverless cloud platforms. In the latter scenario, the remote computer may be connected to the user's computer through any type of network, including a local area network (LAN) or a wide area network (WAN), or the connection may be made to an external computer (e.g., through the Internet using an Internet Service Provider).

Aspects of embodiments of the present invention that are described above with reference to flowchart illustrations and/or block diagrams of methods, apparatus (systems) and computer program products according to embodiments of the invention. The flowchart and/or block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The disclosed technology is disclosed in terms of modules and submodules, each of which are to be understood as discrete units of functionality, which can be embodied as classes, modules, functions, compilation or build artifacts, or other components of one or more programming languages used to implement embodiments of the disclosed technology. While the present description illustrates one organization of the various modules and submodules for implementing embodiments of the disclosed technology, the invention is not so limited. Embodiments of the presently disclosed technology can include other organizations for implementing equivalent or overlapping functionality for the various modules described herein, such as by sharing functionality between modules, combining modules, separating modules into multiple modules, implementing class hierarchies and the like. Additionally, the accompanying drawings illustrate example relationships between various modules and submodules (such as by flowchart connectors or inclusion of modules as sub-modules of other modules), but these relationships are not limiting. As would be recognized by a person of ordinary skill in the art, the output of any given module is available to be included as part of the input of any other component in accordance with various embodiments. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatuses, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described herein were chosen and described in order to best explain the principles of the invention and the practical application, and to enable others of ordinary skill in the art to understand the invention for various embodiments with various modifications as are suited to the particular use contemplated.

Technical effects and benefits include reducing travel time for vehicles, improving revenue generation from toll roads, and improved roadway safety from actively managed roadways.

In some embodiments, the traffic data management system performs a calculation and makes a decision based on the input data for a time interval on a road segment, such as input data received in real time. Examples of such a calculation can include determining a preferred route from a plurality of routes, determining a speed limit for a road segment, or determining a toll rate for a road segment. In some embodiments, a pre-existing system can be in use that makes such decisions using a predetermined algorithm, such as a programmed function, machine learning model, artificial neural network, or other computational system. In such embodiments, the presently disclosed technology can be used to detect instances where the decision made by the predetermined algorithm is anomalous or otherwise unexpected. By implementing the disclosed technology in such circumstances, the health of the predetermined algorithm can be monitored, or the predetermined algorithm can be augmented to produce less anomalous or non-anomalous results. In other embodiments, the predetermined algorithm can be omitted, and instead, a calculation can be performed solely as a result of the techniques discussed herein.

An example embodiment of the disclosed technology is in a managed toll lane system (MTLS). Such a system can comprise one or more road segments, where at least one of the road segments includes both managed and unmanaged lanes. The MTLS can receive historical data, including the toll price charged, for the road segments as described above. The toll price in the historical data can be obtained from a predetermined algorithm, such as a preexisting tolling model implemented by the MTLS.

The MTLS can then vectorize the historical data, and train an isolation forest from that data. The historical data can be annotated with anomaly scores from the isolation forest, and then those rows in the historical data with an anomaly score above a threshold can be clustered into one or more anomaly clusters. Support staff can then review the rows falling within each one of the clusters to determine an adjustment rule that should apply to points within that cluster. The presence of the historical data means that such adjustments can be applied to the historical data, and anomaly scores recalculated to observe whether the adjustments reduced the anomaly scores within the cluster.

Alternatively, as described above, the MTLS can determine adjustment rules for each cluster automatically in accordance with the techniques previously described. While the MTLS is in service, it can monitor real-time input data corresponding to a time interval, and calculate an anomaly score corresponding to that interval. If the anomaly score exceeds a predetermined threshold, the MTLS can then categorize the real-time input data into one of the anomaly clusters. For example, a centroid can be calculated for the anomalous rows in each anomaly cluster in the historical data, and then the distance of the vectorized input data can be calculated to each centroid. The cluster having the nearest centroid is likely to be the cluster to which the real-time data corresponds. The MTLS can then apply the adjustment rule corresponding to that cluster. An MTLS is a single example of a traffic management system in accordance with an embodiment, however, other traffic management systems ("TMS") are contemplated hereby.

Figure 3:
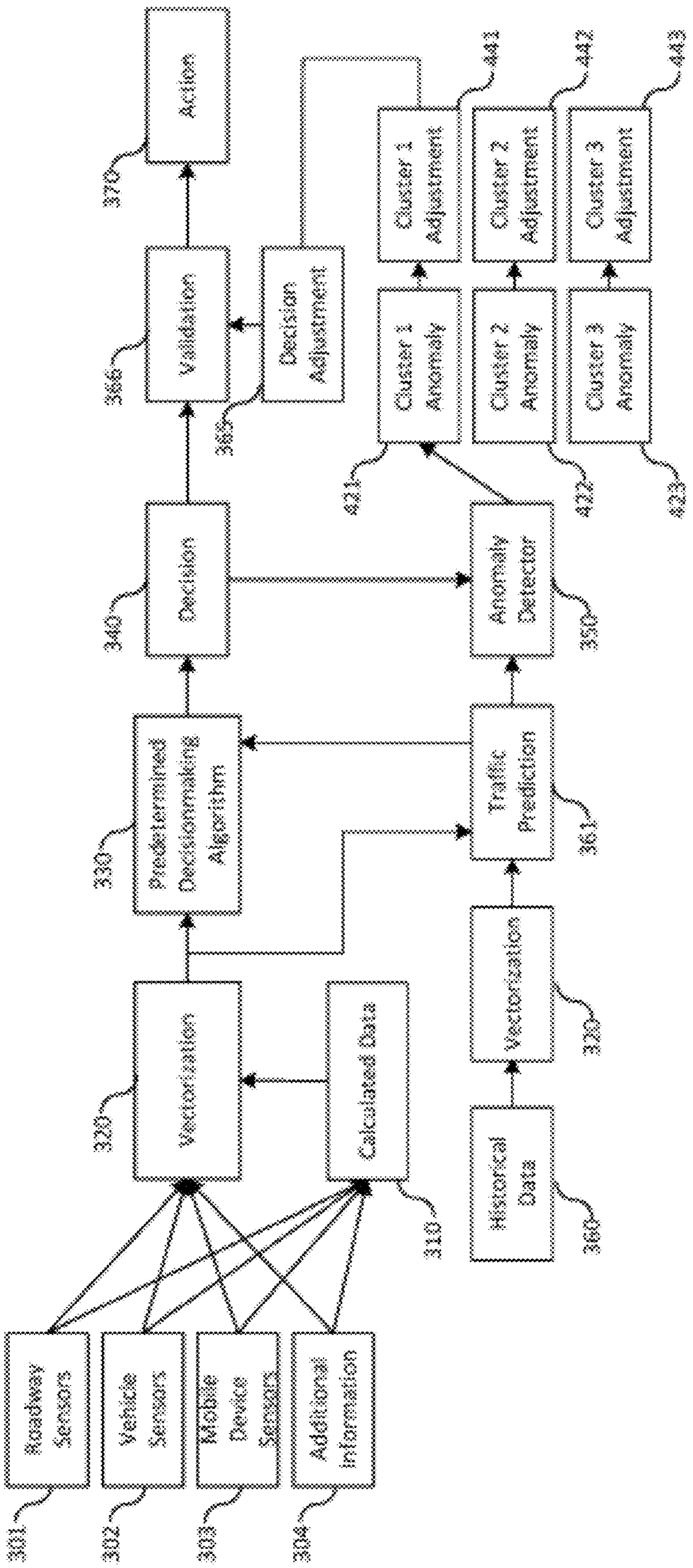
FIG. 3 depicts an example system architecture for a traffic management system, in accordance with some embodiments.

FIG. 3 depicts a TMS 300 in accordance with an embodiment. Such a system can receive data from a plurality of sources, including, but not limited to (1) sensors mounted on or in proximity to the roadway 301, (2) sensors mounted on vehicles 302, or (3) sensors contained within an individual's mobile devices 303 and other devices. Such sources are not intended to be limiting; aspects of the present invention can also include data obtained about the roadway and traffic conditions thereon regardless of source. The data received by the system can comprise various attributes about traffic conditions at the time the measurement is taken, such as speed, relative spacing between vehicles, current lane, how many vehicles have passed over a current spot, etc. In some embodiments, such as those implemented on managed toll lanes, other types of data can be collected, such as toll counts (e.g., how many vehicles have paid a toll, either by stopping at a physical booth, or passing through a sensing gate (e.g., RFID reader, license plate reader, etc.).

Additional information 304 can also be received that is not directly related to traffic, but has an impact on traffic. Such data can include date and time information, such as the current time of day or calendar date. Such data can also include special date information, such as whether a day is a weekday, weekend, or holiday, whether local schools are in session, whether the city offices are open or closed (e.g., due to a natural disaster), etc. Such data can also include special event information, such as whether there is a major event (sporting event, convention, etc.) occurring in the vicinity, construction projects, etc. Such data can also include weather information, such as whether it is raining, rainfall rates, current temperature, current cloud cover, wind speed, wind direction, and hazardous weather alerts (flash flood warnings/watches, hurricane/tornado warnings/watches, etc.).

From this raw data, additional data attributes can be calculated ("calculated traffic data 310"). This can include simple calculation of vehicle detection rates from detection counts, applying categorical thresholds (e.g., is the atmospheric temperature above or below freezing?), or other similar calculations. More advanced calculations can be applied, such as, for example, calculating a probability of ice on the road. Such a calculation may need to take into account, for example, rainfall rates, current temperature, relative humidity, and how long it has been raining.

Data obtained by the TMS can be provided as real-time information, and/or as a historical data set 360 comprising any of the data discussed above over a period of time. Preferably, the same data attributes available in the real-time data are available in the historical data set.

Calculated traffic data 310 for a time interval can also include predicted future information about the road segment, or other road segments. Predicted future information can be based on historical data for similar times and dates, based on extrapolating current information based on recent trends, or produced as the result of a predictive machine learning system (e.g., an artificial neural network, SVM, or other decision model). A collection of data attributes for each time interval, for each road segment can comprise an input data row, and a collection of input data rows for a plurality of time intervals and/or road segments can comprise an input data set. This input data set can then be vectorized into a vectorized data set.

Conversion of the input data attributes into a vector can be referred to as vectorization 320. To facilitate analysis of the input data set, the data attributes for each input row can be converted into a vector in n-dimensional space, wherein each dimension is one of the data attributes for the interval, and the magnitude of the interval in each dimension is calculated as a function of the data attribute. Vectorization of the data can comprise applying one or more rules to one or more attributes of the data set. In some embodiments, vectorization rules can comprise encoding rules, feature selection rules, standardization rules, and dimensionality reduction rules. However, as would be recognized by a person of ordinary skill in the art, each of these categories of steps may be omitted in certain circumstances. For example, if all data attributes are already numeric, no encoding is necessary.

Encoding steps convert one or more attribute values into a format suitable for analysis. For example, attribute values can be organized into time intervals. Such intervals can be short, such as a second, a minute, or five minutes, or can be longer, such as a half-hour, hour, 6 hours, 12 hours, 1 day, or more. Each interval can comprise a plurality of data attributes selected or calculated from the raw traffic data and calculated traffic data, and corresponding to that interval. Such attributes can be a single representative value from the time interval (e.g., mean/median/average roadway speed for a particular segment), or a plurality of representative values (e.g., 25-50-75 percentiles for roadway speed in the interval). Attributes for a time interval can also include information from past intervals, such as, for example, average roadway speed for a segment for the last 1, 2, 5, or 10 intervals. Attributes for a time interval can also include information from other road segments that are adjacent to, feed into, or out of, or otherwise affect roadway conditions on the road segment.

As another example of encoding, if the attribute has an ordinary numeric value, the number can be used as-is (or cast to an appropriate data type, e.g., integers, doubles, etc.). Alternatively, such numeric values can be binned or binarized. For example, if the distribution of a data attribute runs from 0 to 500, the distribution could be binned into groups of 100 (e.g., bin 0: 0-100, bin 1: 101-200, bin 2: 201-300, bin 3: 301-400, bin 4: 401-500), and encoded into bin position (e.g., 55 minutes=>0, 198 minutes=>1). Binarization is a special case of binning with two bins, where a threshold value is determined, and values are encoded as either 0 for below the threshold, or 1 for above the threshold.

If the attribute is ordered categorical data, the categorical data can be encoded as an integer value indicating its position. The attributes can also be vectorized into standard deviations from a mean value. If the attribute is a compound data object, such an array, structure, map, or similar indexed/keyed data structure, the vectorization rule can be a function to perform on the data to extract a numeric value, such as picking a particular value from the structure, or calculating a statistic based on the structure. In some embodiments, the vectorization rules can produce multiple output columns for one or more input columns. For example, a single numeric value can be vectorized into a first column by using the numeric value directly and into a second column as a bin number. Alternatively, a vectorized column can be vectorized as a ratio or comparison between multiple input columns Vectorization 320 can also comprise standardization rules to standardize, scale, center, or perform other statistical numeric transformations. Such transformations can include scaling the values to a range (e.g., normalization between 0 and 1), centering on average value, scaling to a known distribution (e.g., Gaussian distribution), filling in missing data (e.g., either a zero or a computed value such as an average value), or eliminating outliers (e.g., data beyond a certain distance, such as number of standard deviations, from the mean).

Vectorization 320 can also comprise dimensionality reduction techniques. As is known in the art, machine learning and statistical estimation often suffers from the "curse of dimensionality," having too many dimensions or degrees of freedom to feasibly calculate. Therefore, vectorization can, in some embodiments, comprise dimensionality reduction techniques, such as principal component analysis (PCA), non-negative matrix factorization (NNMF), and latent Dirichlet allocation (LDA), and other techniques known in the art.

Vectorization 320 can also comprise feature selection criteria. In some embodiments, not all attribute values are used. In general, it is desirable for the selected data attributes to not be highly correlated with each other. From the available attribute values, certain attributes can be included or excluded based on industry expertise or hypotheses about correlations in the data. Using multiple highly correlated input values can increase the computational complexity of training the model without meaningfully improving performance. One method of eliminating correlated data is to calculate a correlation coefficient between each pairwise set of attribute values, aggregating attributes into groups or categories of correlated attribute values, and then dropping all but one or a few of the correlated attribute values in each of the groups of correlated attribute values. This correlation coefficient-based technique can be applied at any stage of the vectorization process, either to the raw attribute values, encoded attribute values, or standardized attribute values.

In some embodiments, a traffic prediction 361 step can be applied to vectorized data. In this step, the values of the vectorized traffic data is predicted at a predetermined time interval in the future. Any predicting modeling technique as is known by a person of ordinary skill in the art can be used for traffic prediction 361, including but not limited to regression techniques. In some embodiments, traffic prediction 361 can be performed using an artificial neural network. In some embodiments, such artificial neural network can utilize architectures intended to predict time series information, such as a recurrent neural network, or long-term/short-term memory (LTSM) network.

In some embodiments, a TMS 300 can include a predetermined decisionmaking algorithm 330. This algorithm can comprise a pre-existing module, system, or other pre-existing component for receiving input data 301-304 and producing a decision 340. The predetermined decisionmaking algorithm 330 can comprise a plurality of rules, if-then statements, or other procedural software in some embodiments. In some embodiments, the predetermined decisionmaking algorithm 330 can receive as input vectorized data 320 or predicted traffic data from traffic prediction technique 361. In some embodiments, the predetermined decisionmaking algorithm 330 can comprise a machine learning model, such as an artificial neural network, decision tree, support vector machine, or other similar model. The predetermined decisionmaking algorithm 330 can produce a decision 340, such as a decision to set or adjust a toll price (in the case of a MTLS), or to set or adjust other traffic-related features, such as speed limits, traffic flow control devices, automatic gates, lighting or signage, and other similar features.

In some embodiments, the traffic management detection system can comprise an anomaly detection technique 350, performed on either the input data alone (either vectorized 320 or not), or the input data combined with a decision 340 made by the TMS 300. In some embodiments, the anomaly detection technique 350 can be performed using predicted traffic data generated by traffic prediction technique 361. This anomaly detection 350 can be performed against a historical data set 360 that comprises prior input data 301-304 (either vectorized 320 or not) and prior decisions 340 (if a predetermined decisionmaking algorithm 330 is present) to determine, for example, whether the current input data 301-304 is anomalous, or whether the decision 340 in view of the input data 301-304 is anomalous. The historical data 360 can comprise, for example, data from the prior month, prior year, or any other time interval. Such historical data can also be a trailing window of data—such as the prior six months, prior year, etc.

Examples of anomaly detection techniques that can be performed include a robust covariance, one-class support vector models, isolation forests, and Local Outlier Factor ("LOF"), among other anomaly detection techniques as are known in the art. One class of techniques that are useful for embodiments are isolation forests. This technique takes advantage of two quantitative properties of anomalies: i) they are the minority consisting of few instances, and ii) they have attribute-values that are very different from those of normal instances. In other words, anomalies are 'few and different', which make them more susceptible to isolation. Isolation can be implemented by any means that separates instances. One method is to use a binary tree structure called an isolation tree (iTree), which can be constructed effectively to isolate rows. Because of the susceptibility to isolation, anomalies are more likely to be isolated closer to the root of an iTree; whereas normal points are more likely to be isolated at the deeper end of an iTree.

Isolation Forest (iForest) techniques build an ensemble of iTrees for a given data set; anomalies are those instances which have short average path lengths on the iTrees. There are two training parameters and one evaluation parameter in this method: the training parameters are the number of trees to build and subsampling size; the evaluation parameter is the tree height limit during evaluation. We show that iForest's detection accuracy converges quickly with a very small number of trees; it only requires a small subsampling size to achieve high detection accuracy with high efficiency; and the different height limits are used to cater for anomaly clusters of different density.

Isolation means "separating an instance from the rest of the instances." In general, an isolation-based method measures individual instances' susceptibility to be isolated; and anomalies are those that have the highest susceptibility. To realize the idea of isolation, data structures can be used that naturally isolate data. In randomly generated binary trees where instances are recursively partitioned, these trees produce noticeable shorter paths for anomalies since (a) in the regions occupied by anomalies, less anomalies result in a smaller number of partitions—shorter paths in a tree structure, and (b) instances with distinguishable attribute-values are more likely to be separated early in the partitioning process. Hence, when a forest of random trees collectively produce shorter path lengths for some particular points, they are highly likely to be anomalies.

Anomaly detection using iForest is a two-stage process. The first (training) stage builds isolation trees using sub-samples of the given training set. The second (evaluation) stage passes test instances through isolation trees to obtain an anomaly score for each instance. In the training stage, iTrees are constructed by recursively partitioning a sub-sample X' until all instances are isolated. Details of the training stage can be found in Algorithms 1 and 2. Each iTree is constructed using a sub-sample X' randomly selected without replacement from X, $X' \subset X$.

In some embodiments, there are two input parameters to the iForest algorithm: the subsampling size ψ and the number of trees t. Subsampling size ψ controls the training data size. We find that when ψ increases to a desired value, iForest detects reliably and there is no need to increase ψ further because it increases processing time and memory size without any gain in detection accuracy. As we assume that anomalies are few and different, normal points are also assumed to be many and similar. Under these assumptions, a small subsampling size is enough for iForest to distinguish anomalies from normal points. Number of trees t controls the ensemble size. We find that path lengths usually converge well before t=100. At the end of the training process, a collection of trees is returned and is ready for evaluation. The worse case time complexity of training an iForest is O(tψ2) and the space complexity is O(tψf).

In the evaluation stage, a single path length h(x) is derived by counting the number of edges e from the root node to an external node as instance x traverses through an iTree. When the traversal reaches a predefined height limit hlim, the return value is e plus an adjustment c(Size). This adjustment accounts for estimating an average path length of a random sub-tree which could be constructed using data of Size beyond the tree height limit. When h(x) is obtained for each tree of the ensemble, an anomaly score is computed. The anomaly score and the adjustment c(Size) are to be defined in the next subsection. The worse case time complexity of the evaluation process is O(ntψ), where n is the testing data size.

An anomaly score can be calculated for each row in a data set. Since iTrees have an equivalent structure to Binary Search Tree ("BST"), the estimation of average h(x) for external node terminations is the same as that of the unsuccessful searches in BST. We borrow the analysis from BST to estimate the average path length of iTree. Given a sample set of ψ instances, the average path length of unsuccessful searches in BST is:

where H(i) is the harmonic number and can be estimated by ⌊n(i)+0.5772156649 (Euler's Constant). As c(ψ) is the average of h(x) given ψ, it can be used to normalize h(x). The anomaly score s of a row can then be defined as, for example:

A point is more likely to be an anomaly as the score approaches 1, and less likely to be anomalous as the score approaches 0. A point can then be determined to be anomalous if the anomaly score is over a particular threshold, such as, for example, 0.5.

Isolation forests techniques are well-suited for embodiments of the disclosed technology, because they work well for highly-dimensional data, and are computationally efficient. Many implementations have linear or near-linear complexity bounds (i.e. O(n)). Further, isolation forests can facilitate visualization of outlier boundaries, as contours of a constant anomaly score can be calculated. By applying an isolation forest to the input data, an anomaly score can be calculated for each input value. Further, by training an isolation forest, the same forest can be applied to future data to calculate an anomaly score given the historical data set. In some embodiments, an isolation forest technique can be performed on a vectorized historical data set, and the anomaly score calculated for each, or a plurality of, rows in the vectorized historical data set. These anomaly scores can be added as an additional dimension of the vectorized historical data set.

In embodiments where anomaly detection 350 is not performed on decisions made by a predetermined algorithm 330, anomaly detection 350 can be used to monitor the health of the input data sources 301-304. That is, rows having a high anomaly score can indicate that sources of input data 301-304 are not operating correctly, or that the roadway is experiencing a rare and unexpected set of circumstances. In embodiments where the anomaly detection 350 is performed on decisions 340 made by a predetermined algorithm 330, anomaly detection 359 can be used to monitor the health of the predetermined algorithm. That is, combinations of input data 301-304 and a decision 340 having a high anomaly score may indicate suboptimal performance of the predetermined algorithm 330, and identify instances where the predetermined algorithm 330 should be modified or augmented. In some embodiments, the anomaly scores of historical data can be analyzed to identify times in the past where erroneous or unexpected behavior has occurred, or the anomaly score of real time data can be calculated to determine whether an anomalous condition is currently occurring. Such embodiments follow the same data path as the TMS 300 described herein, but the input data 301-304 is simulated from a point in time from the historical data 360.

Figure 4:
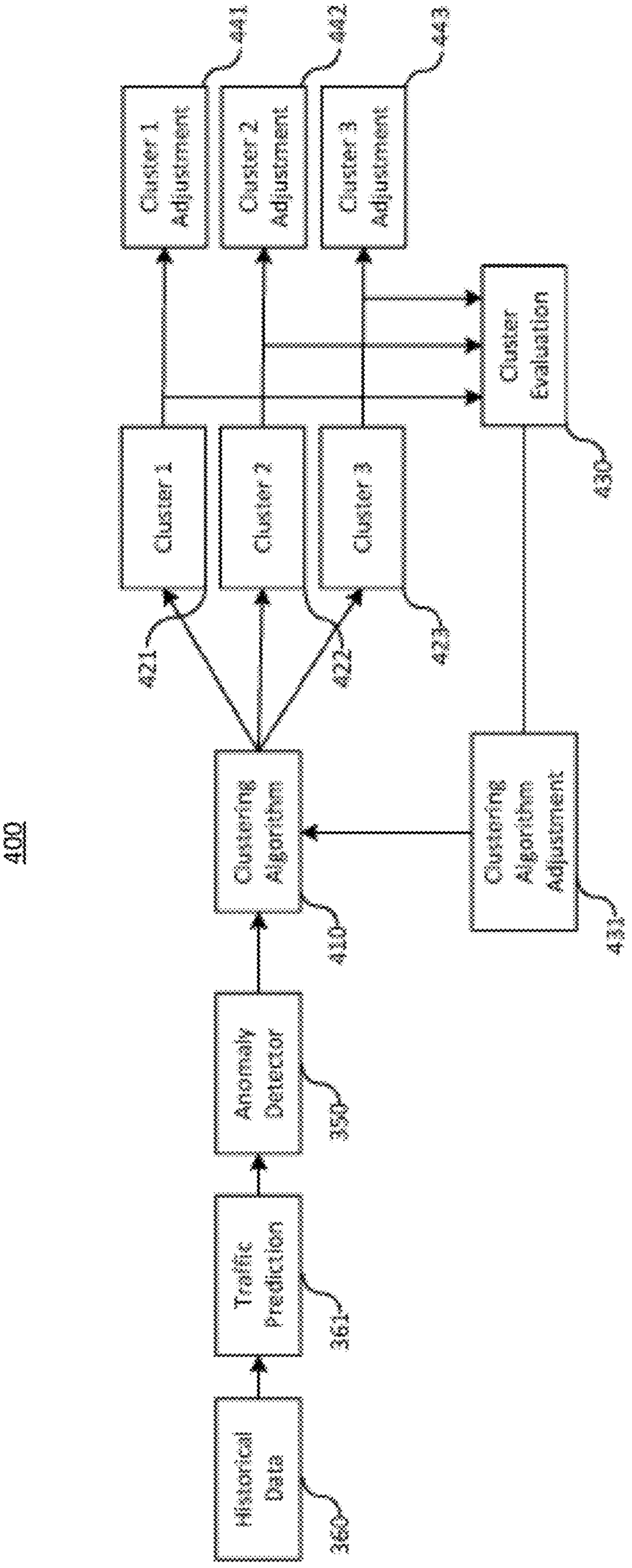
FIG. 4 depicts an example system for analyzing and clustering historical data in accordance with some embodiments.

FIG. 4 depicts a process identifying anomaly types 400, in accordance with an embodiment. In some embodiments, a historical data set 360 that has been annotated with anomaly scores by the anomaly detector 350 can be used to identify particular types of anomalies using a clustering algorithm 410. In some embodiments, the anomaly scores are calculated by the anomaly detector 350 based on predicted traffic data produced by a traffic prediction technique 361. In some embodiments, identification of anomaly types can be used to assist support staff in identifying the failure mode and correcting the anomalous conditions. In some embodiments, the identified anomaly types can be automatically corrected by a TMS in accordance with embodiments. This clustering 410 can either be performed on all historical input data, to determine clusters of similar points generally, or can be applied only to that historical data that is considered "anomalous" as determined by an anomaly detection technique.

To identify anomaly types, a clustering algorithm 410 can be performed on the vectorized data set. This clustering can be performed by an automatic segmentation mechanism, wherein each row in the vectorized data set is divided into groups, where each row in the group is relatively similar to others in the group, and is relatively dissimilar from members of other groups. A variety of techniques exist for clustering data in this manner. Automatic clustering algorithms that are known in the art include k-Means, Affinity Propagation, Mean Shift, Spectral Clustering, Ward Clustering, Agglomerative Clustering, DBSCAN, Birch, and Gaussian Mixture. Each of these techniques first require as input a plurality of points in n-dimensional space, such as vectorized data 320.

In some embodiments, the clustering algorithm 410 can be provide a predetermined number of groups into which to subdivide the input data. In some embodiments, the number of groups can be programmatically selected by repeating the clustering algorithm with various numbers of groups, and evaluating the quality of the clusters, and selecting a number of groups that provides the best performance. In such a process, the quality of the individual clusters can be evaluated 430, and adjustments 431 to the clustering algorithm can be made based on that evaluation. Many clustering algorithms, likewise, can use various distance measures to evaluate the quality of individual clusters. While the default in most circumstances is Euclidean distance (e.g., straight line distance), many other distance metrics can be used, such as squared Euclidean distance, standardized Euclidean distance, cosine distance, Manhattan distance, Bray-Curtis distance, Canberra distance, Chebyshev distance, Jensen-Shannon distance, Mahalanobis distance, Minkowski distance, and other distance metrics as are known in the art.

The clusters can also be evaluated 430 to ensure adequate performance. Evaluation criteria can include, for example, determining the average density of each cluster, distortion (mean sum of squared distances to centers), intercluster distances, calculating the Variance Ratio Criterion (Calinski Harabaz score), calculation of a silhouette score (mean ratio of intra-cluster and nearest-cluster distance), or other similar metrics. These performance criteria can be compared to a minimum or maximum acceptable value. Alternatively, the clustering can be repeated using different vectorization rules, algorithms, desired number of groups, and/or distance measures, and the scores recalculated to see if they improve or worsen. Techniques for such evaluation can also comprise generating an elbow chart (e.g., mapping one or more fit scores/computational performance metrics against choices for number of groups), silhouette visualizations, or intercluster distance maps. Where a vectorized data set has been clustered, the vectorized data set can be annotated with an additional dimension corresponding to its cluster membership. (e.g., Cluster 1, Cluster 2, etc.)

Because each cluster 421-423 represents anomalous rows that are similar to one another, each cluster can be considered an anomaly type. Once time interval data is divided into clusters, a set of rules or algorithmic technique can be applied to the data points in the cluster to make an adjustment 441-443. For example, a human programmer can review the points categorized into a single cluster, and study why those points are anomalous. The human programmer can then apply knowledge obtained from the data set, domain knowledge (e.g., knowledge about traffic patterns and roadway conditions) and other expertise to derive a calculation or rule that applies to the cluster.

In some embodiments, where an existing technique is used to calculate decisions, the TMS can determine adjustments 441-443 to calculate decisions automatically. In some embodiments, such an adjustment can be calculated on a cluster-by-cluster basis. One method of doing this would be to calculate the average adjustment to the decision that, if added to each vector in a cluster of anomalous vectors, would reduce the anomalousness of the vector, such as by lowering its anomaly score below a predetermined threshold. Another method of doing this would be to calculate the centroid of each cluster of anomalous vectors, and determine an adjustment necessary to move the centroid of the anomalous vectors such that it would have an anomaly score below a predetermined threshold.

In some embodiments, where the anomaly detection 350 is performed on a data set containing decisions, the TMS can automatically determine an adjustment 441-443 to the decision based on historical data in the absence of clustering. In some embodiments, an anomalous vector can be analyzed to determine a gradient of anomaly score along the dimension of the decision. Stated another way, the TMS can determine how the decision should be adjusted to reduce the anomaly score of the point (e.g., by a predetermined amount, or such that the anomaly score falls below a given threshold).

A simple gradient calculation can be performed by gradient descent techniques as are well known in the art. For example, an anomaly score can be calculated for a point as a small distance in a random direction from the specific data point. If the anomaly score decreases in that direction, the decision can be moved in that direction. If the anomaly score increases in that direction, the decision can be moved in the opposite direction. The process then repeats until a terminating condition is met, such as by having an anomaly score reduced by a predetermined amount, reducing it below a predetermined threshold, or finding a local minimum.

In other embodiments, the TMS can determine how the decision should be adjusted by performing a k-nearest neighbors ("KNN") search around the anomalous point for non-anomalous points. The decision can then be adjusted to match the predicted value for the nearest non-anomalous point, or an average of a predetermined number of nearest non-anomalous points, or the direction of the nearest non-anomalous point can be used as a direction, and then the decision corresponding to the row can be adjusted in that direction until its anomaly score falls below a predetermined threshold.

The adjustments 441-443 can be used in the TMS 300 where the anomaly detector 350 determines an anomalous condition. The anomaly detector can assign the vector representing an anomalous condition to one of the predetermined clusters 421-423 from system 400, and then apply the corresponding adjustment 441-443. In some embodiments, the anomaly detector can assign the anomalous vector to the predetermined clusters 421-423.

Figure 5:
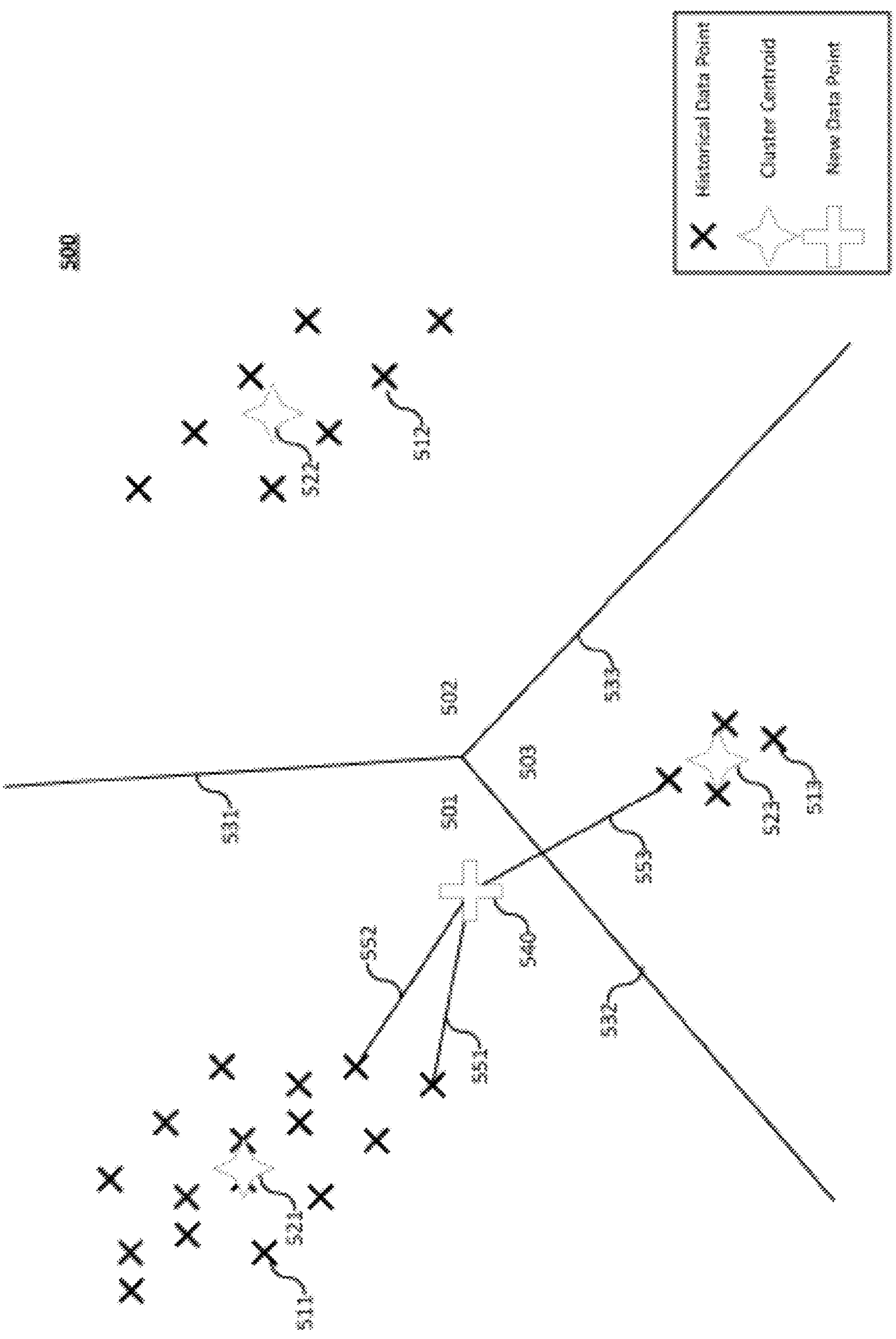
FIG. 5 depicts example methods for assigning new data to existing clusters of data, in accordance with some embodiments.

FIG. 5 depicts an example process 500 for assigning new points to existing clusters. The process in FIG. 5 is a simplified form of clustering, reduced to two dimensions, for ease of explanation. As will be understood by persons of ordinary skill in the art, similar techniques can be applied to higher-dimensional spaces, including spaces not visualizable (e.g., 100 or more dimensional space). The clustering algorithm 410 divides a plurality of historical data points (e.g., 511-513) into a plurality of clusters 501-503. The centroid of each cluster 521-523 can be calculated as the average or mean point for the points assigned to that cluster. Boundary lines 531-533 can be calculated between each of the clusters 501-503 by dividing the plotting space into Voroni cells by partitioning the available space into regions closest to each centroid, resulting in boundaries 531-533. A new data point 540, such as a vector representing input data 301-304 and/or a decision 340, can be assigned to a cluster by comparing the new data point 540 to the cluster boundaries 531-533, and assigning it to the cluster corresponding to the region within which new data point 540 falls. For example, new data point 540 would be assigned to cluster 501. Another example technique for assigning a new data point 540 to a cluster would be to perform a KNN search for a predetermined number of historical data points, and assigning the point to the cluster corresponding to the majority of nearest neighbors. For example, if a KNN search for the three nearest neighbors was conducted for new data point 540, two of the nearest neighbors would belong to cluster 501 (as shown by lines 551 and 552), and one neighbor would belong to cluster 503 (as shown by line 553). Accordingly, new data point 540 would be assigned to cluster 501.

Once a new data point 540 has been assigned to a corresponding cluster 501-503, the corresponding adjustment can be performed. Returning to FIG. 3, if an anomaly is detected by anomaly detector 350, the anomaly detector can assign the anomaly to one of clusters 421-423. In the example depicted in FIG. 3, the anomaly is determined to be a Cluster 1 Anomaly 421. A corresponding adjustment rule 441 is then applied to the anomalous data, and provided to an adjustment module 365, which provides the adjustment to the decision 340, as determined by the predetermined decision making algorithm 330. In some embodiments, the decision adjustment 365 can be validated 366 prior to application. For example, the validation process 366 can perform quality control on the decision adjustment 365 to ensure that the output to the action 370 is reasonable. Examples of such validation include ensuring compliance with business rules (e.g. minimum or maximum speed limits, tolls), and reasonableness (e.g. within a maximum variation of previous values). If validation 366 fails, the decision 340 from the predetermined decision making algorithm 330 can be based through to action 370 without applying decision adjustment 365. An action 370 is then performed in accordance with the adjusted decision by, for example, setting a toll, adjusting a speed limit, opening or closing traffic flow control devices, activating signage or displaying messages thereon, or other similar traffic-related actions.

Figure 6:
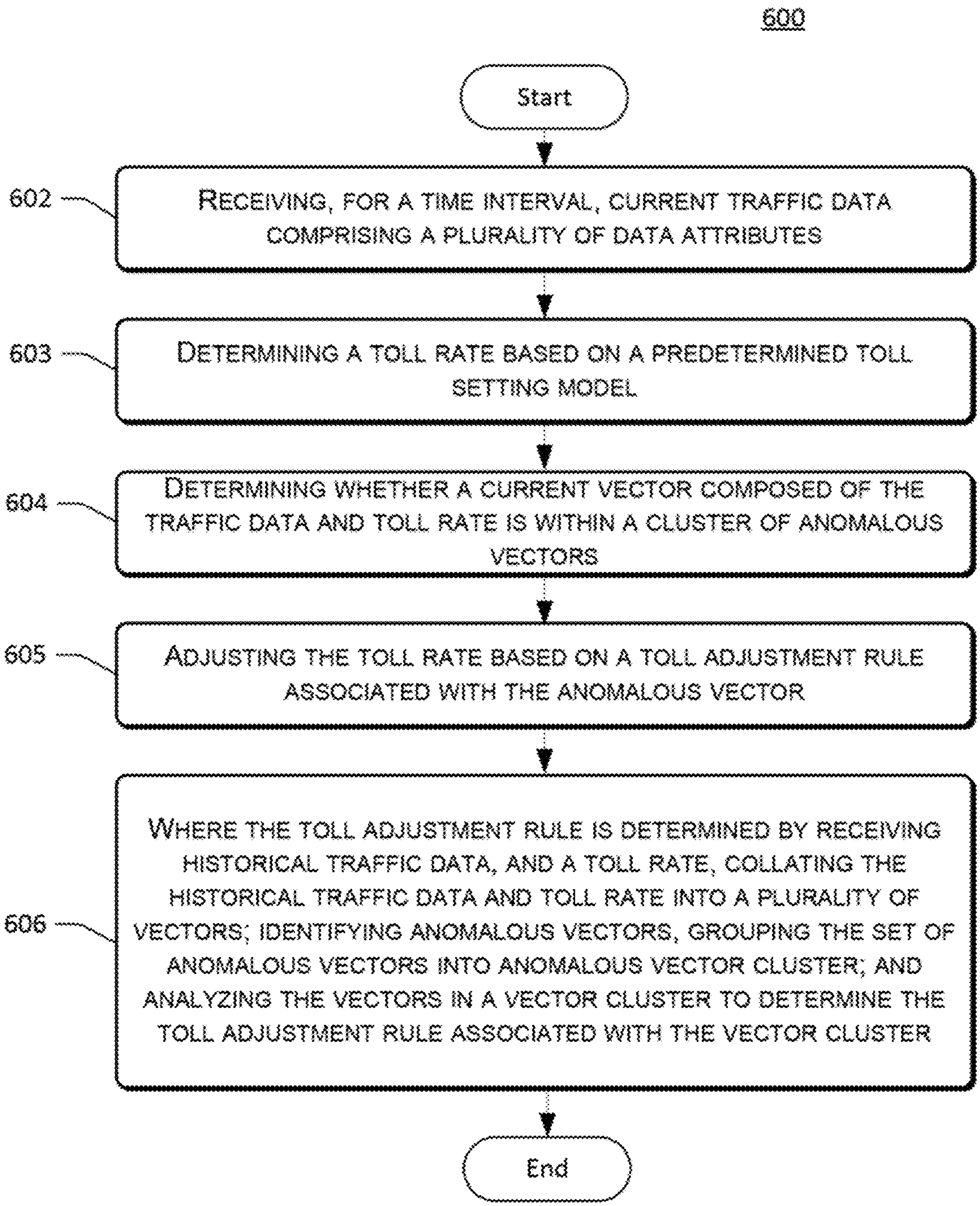
FIG. 6 depicts a computer-implemented method in accordance with some embodiments.

FIG. 6 depicts a computer-implemented method for determining a toll rate for a toll road 600, in accordance with an embodiment. In some embodiments, the method comprises the step 602 of receiving, for a time interval, current traffic data comprising a plurality of data attributes, composed of: roadway traffic data, tolling traffic data, and calculated traffic data. In some embodiments, the method comprises the step 603 of determining a toll rate based on a predetermined toll setting model. In some embodiments, the method comprises the step 604 of determining whether a current vector composed of the traffic data and toll rate is within a cluster of anomalous vectors. In some embodiments, the method comprises the step 605 adjusting the toll rate based on a toll adjustment rule associated with the anomalous vector. In some embodiments, the toll adjustment rule is determined 606 by receiving, for a plurality of time intervals, historical traffic data comprising the plurality of data attributes, and a toll rate corresponding to each time interval, collating the historical traffic data and toll rate into a plurality of vectors, wherein each vector comprises the traffic data and toll rate corresponding to a single time interval; identifying a plurality of anomalous vectors from within the plurality of vectors, where each vector in the set of anomalous vectors is anomalous relative to the plurality of vectors; grouping the set of anomalous vectors into a plurality of anomalous vector clusters, wherein each anomalous vector cluster comprises a subset of anomalous vectors selected from the set of anomalous vectors, and wherein each anomalous vector in an anomalous vector cluster is closer to other anomalous vectors in the anomalous vector cluster than to anomalous vectors in other anomalous vector clusters, according to a distance metric; and analyzing the vectors in a vector cluster to determine the toll adjustment rule associated with the vector cluster.

According to some embodiments, the systems and methods described herein provide an adaptable system to various roadway environments and integration with other smart transportation systems. The system can be configured with machine learning methodologies with predictive capabilities, such as the ability to predict and share future traffic conditions with connected-automated vehicles, roadway managers, and others to enhance and improve route and trip planning, traffic management and improving overall traffic flow. As used herein, the term "connected-automated vehicle" or "CAV" for short, is a broad term, and generally speaking, is used to refer to any vehicle that is able to communicate with the systems described throughout this disclosure. A connected-automated vehicle (CAV) is therefore one that is able to communication directly with systems associated with the roadway, other vehicles, roadway infrastructure, the traffic monitoring systems, cloud-based computing systems, and others. This may be accomplished, for example, by dedicated short-range communications (DSRC), cellular vehicle to everything networks (C-V2X), vehicle to everything (V2X)(such as vehicle to vehicle (V2V), vehicle to infrastructure (V2I), vehicle to pedestrian (V2P), or vehicle to network (V2N)), Bluetooth, Wi-Fi, 5G, multi-access edge computing (MEC), Non Terrestrial Network (NTN) among others and other protocols that are yet to be developed. A connected-automated vehicle also includes a vehicle in which an occupant has a mobile computing device that is able to communicate with external systems, which may include one or more of a smartphone, a smart watch, a mobile computing device, a laptop computing device, a tablet computing device, smart glasses or other wearable devices, among others. In many cases, a mobile computing device, by its virtue of being associated with an occupant of a vehicle, may share a common location, speed, direction, acceleration and deceleration, and a destination with the vehicle and therefore may provide important information regarding the location and motion of the vehicle. A CAV may also include a fully, or partially, autonomous vehicle. That is, a vehicle that can be self-driving or is fully self-driving.

In some cases, the system may provide future estimated toll prices for managed lanes and roadways and receive acknowledgements from navigation systems, such as from connected-automated vehicles, smart phones, and other devices that may interact with mapping data and/or trip planning responsibilities, which allows for more accurate trip time calculations and optimized route selections. The systems and methods further allow for cost savings to users by choosing optimal travel times and routes based on real-time, and future predicted, toll and traffic information. As with any embodiment described herein, another benefit is reduced vehicle emissions from improved traffic flow and lower roadway congestion which further supports environmental sustainability goals.

For example, according to some embodiments the system is configured to receive information associated with current traffic and/or roadway conditions and identifying multiple routes for which traffic conditions will be monitored. In some cases, the system receives trip planning information from a navigation system that has identified one or more travel routes and a request for information regarding the one or more travel routes. The system may predict future traffic conditions and/or future tolls for the one or more travel routes along with an estimated travel time for the one or more travel routes and return this information to the requesting navigation system. The system may further, based in part on the future predicted roadway conditions, determine a toll rate for managed lanes to optimize traffic flow and travel times along the routes.

The system may receive a request from a connected-automated vehicle, such as a request for a travel time along a route and the route may have a managed lane and a non-managed lane. The system may determine, based in part on real-time traffic data as well as future predicted traffic data along the requested route, travel times along the managed lane, the non-managed lane, and a cost associated with the managed lane, and provide the travel time saved and cost associated with the travel time saved to the connected-automated vehicle. For example, the system may monitor traffic flow in the non-managed lane with the same roadside sensors and systems and therefore has accurate real-time traffic data for determining travel times that it can share with the CAV, including incident induced congestion, among other factors. In some cases, the CAV includes a navigation application that computes the travel time along the non-managed lane and provides that travel time to the unique systems described herein, which is then able to compare the travel time provided by the navigation application and to the predicted travel time and return the time saved by using the managed lane rather than the unmanaged lane. The connected-automated vehicle may respond with a selection of either the managed lane or the non-managed lane or not respond at all. In some cases, a selection of the managed lane will also process a payment associated with the connected-automated vehicle.

Figure 7:
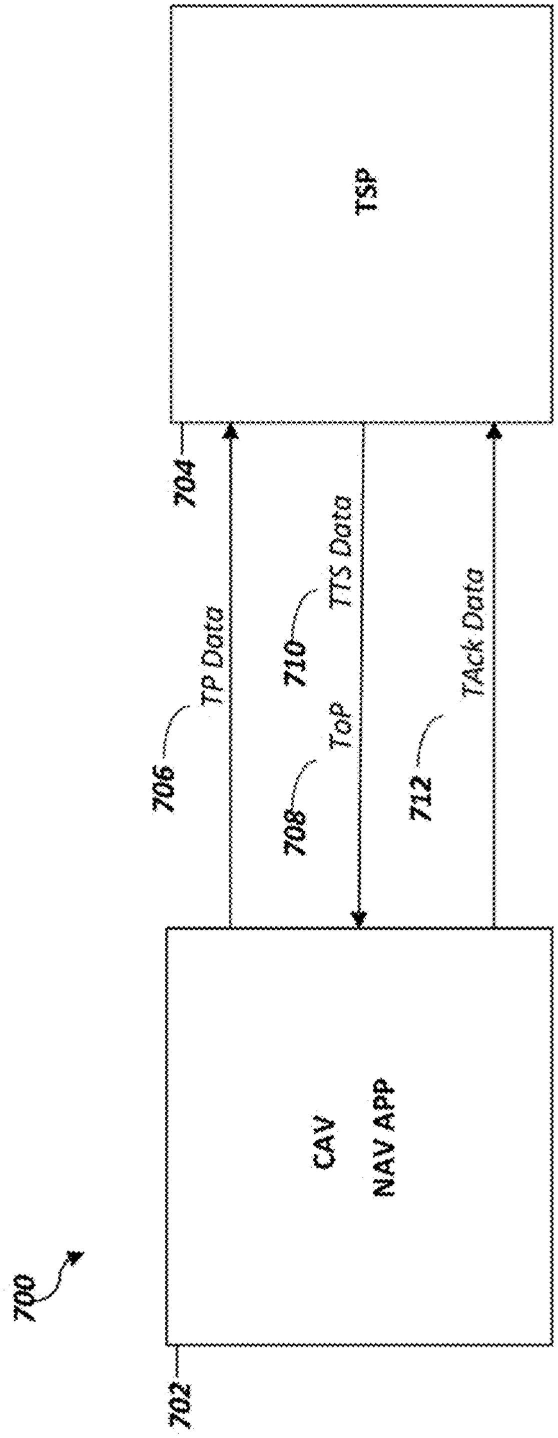
FIG. 7 illustrates a schematic block diagram of a tolling system sharing a toll price interval and travel time saved with a connected-automated vehicle, in accordance with some embodiments.

FIG. 7 is a schematic illustrating a tolling system sharing a toll price interval and travel time saved with a connected-automated vehicle. As with all the embodiments described herein, the connected-automated vehicle may include a connected-automated vehicle, a vehicle with a navigation application, or a computing device having a navigation application that may communicate with the systems described herein. For simplicity and ease of description, this disclosure will use the term CAV to refer to any type of connected-automated vehicle as that term has been defined herein. For instance, the CAV 702 may include a computing device associated with the CAV 702. The computing device (s) may correspond to in-vehicle navigation systems or other devices connected to the vehicle, such as cellular based smartphones, tablet devices that can provide network connectivity global positioning systems and processing resources for enabling a user to communicate with the toll service provider 704 (TSP).

The CAV may send Trip Planning Data (TP) 706 to the TSP 704, which may include one or more of a desired route, a current position, a current speed, a time of arrival at an entry or exit to a managed lane, among others. In some cases, the CAV 702 may associate the route with an ID that determines the correct toll service provider which may be a public agency or a private entity. The TP data 706 may additionally contain a user profile associated with the vehicle, a make and/or model of the vehicle, license plate information of the vehicle, toll-tag identification, banking details, and may further include sequential updates of the TP data 706 as the vehicle progresses along the route.

The TP data 706 may further include a request for information regarding the physical attributes of the toll facility, such as, for example, entry points, exit points of the managed lanes. The TSP 704 may respond with information regarding the physical attributes of the toll facility in any suitable format, but in some cases may be provided in a geo-json file. For clarity, A geo-json file is a format for encoding various geographic data structures using JavaScript Object Notation (JSON). It is designed to represent simple geographical features, along with their non-spatial attributes. Geo-json supports the representation of Points (e.g., locations of specific places); LineStrings (e.g., paths, streets, and rivers); Polygons (e.g., boundaries of areas like cities, states, countries); MultiPoints; MultiLineStrings; and MultiPolygons (combinations of the above types); and GeometryCollections (groups of different types of geometries).

Geo-json files consist of a series of Feature objects or a single Geometry object. Each feature in a geo-json file has geometry (coordinates that specify the shape and location) and properties (descriptive information about the feature).

The CAV 702 uses the returned information to choose one or more routes in relation to the toll facility and may send its estimated time of arrival to the entry point and may further choose an exit of one or more routes. In some cases, the process may take several iterative steps depending on the information the CAV 702 has or requests. As an example, the CAV 701 may request, in a first request, multiple entries and exits way-points within the managed lane facility. After the TSP 704 provides the requested data, the CAV 702 may be unable to determine its arrival time to the entry points. Once the arrival time is determined, the CAV 702 may send this information to the TSP 704 and receive the toll price and travel time saved by using the managed lane. In some cases, the CAV 702 may already know the entry and exit points to the managed lane and may simply request toll pricing and estimated time saved based on its arrival time to the desired entry point and its exit point from the managed lane.

The TSP 704 may be associated with an operating agency or authority responsible to the managed lane. It should be appreciated that throughout this disclosure, the term "managed lane" is a broad term and refers to a type of traffic lane or roadway that is actively managed to optimize traffic flow, improve travel time reliability, and reduce congestion. Managed lanes may use a combination of operational strategies, often involving restrictions or special pricing, to control access and maintain optimal driving conditions within these lanes. Some examples of managed lanes include high occupancy vehicle lanes (HOV), high occupancy toll lanes (HOT), express toll lanes, bus-only lanes, truck-only lanes, reversible lanes, and toll roads.

In some cases, the TSP 704 is the agency responsible for operating and maintaining the managed lane may also manage the collection of tolls and customer accounts. The TSP 704 may include all the necessary systems to monitor the roadway traffic including roadside sensors, 3rd party data, integrated traffic management systems, servers and databases for traffic prediction and toll setting algorithms, internal and external communication networks, electronic toll collection (ETC) system, as well as the commercial back-office systems for managing transactions, payment processing and customer relationship management systems (CRM).

The TSP 704 may send, to the CAV 702, a toll price (ToP) data 708, which may be a current toll price, or a predicted future estimated toll price. The TSP 704 may also send data indicative of a travel time saved (TTS) 710 that corresponds with selecting a managed lane versus an unmanaged lane. For ease of description throughout, an unmanaged lane is one that is not associated with a toll or other restrictions, and may be referred to interchangeably as a general purpose lane. In some cases, the TSP 704 uses the estimated time of arrival to the entry point and chosen exit point for one or more routes and determines the future travel time saved associated with the routes. The TTS 710 is the difference in total journey time by choosing to take the managed lane in lieu of general purpose lane for one or more routes as well as the associated price for each alternative. This information is sent back to the CAV 702.

In some cases, additional information associated with a route or routes for both the managed lanes and general purpose lanes can be sent back to the CAV 702 such as information regarding periodic check-in requirements for the CAV 702, ongoing incidents or wrecks, active ramp metering, work or construction zones, as well incentive based information such as discounts for delaying travel so a wreck can be cleared, or customer loyalty points and other commercial incentives from participating business along the routes.

The CAV 702 may process the ToP data 708 and the TTS Data 710 and make an intelligent decision whether to access the managed lane or not. In response, the CAV may send a Trip Acknowledgement (TAck data) 712 to the TSP 704, which may be used to determine future roadway conditions along the managed lane and/or general purpose lane. The TAck data 712 may include further information, such as an acceptance of the tolling amount for accessing the managed lane, a rejection of the route containing the managed lane, meeting passenger requirements for HOV or HOT lane access or discounts.

As with all the embodiments described herein, the toll price may be based on future traffic conditions which may be correlated to the trip plan data provided by the CAV 702 (route or entry and exit points within the managed lane facility and the estimated arrival time to the entry point).

Figure 8:
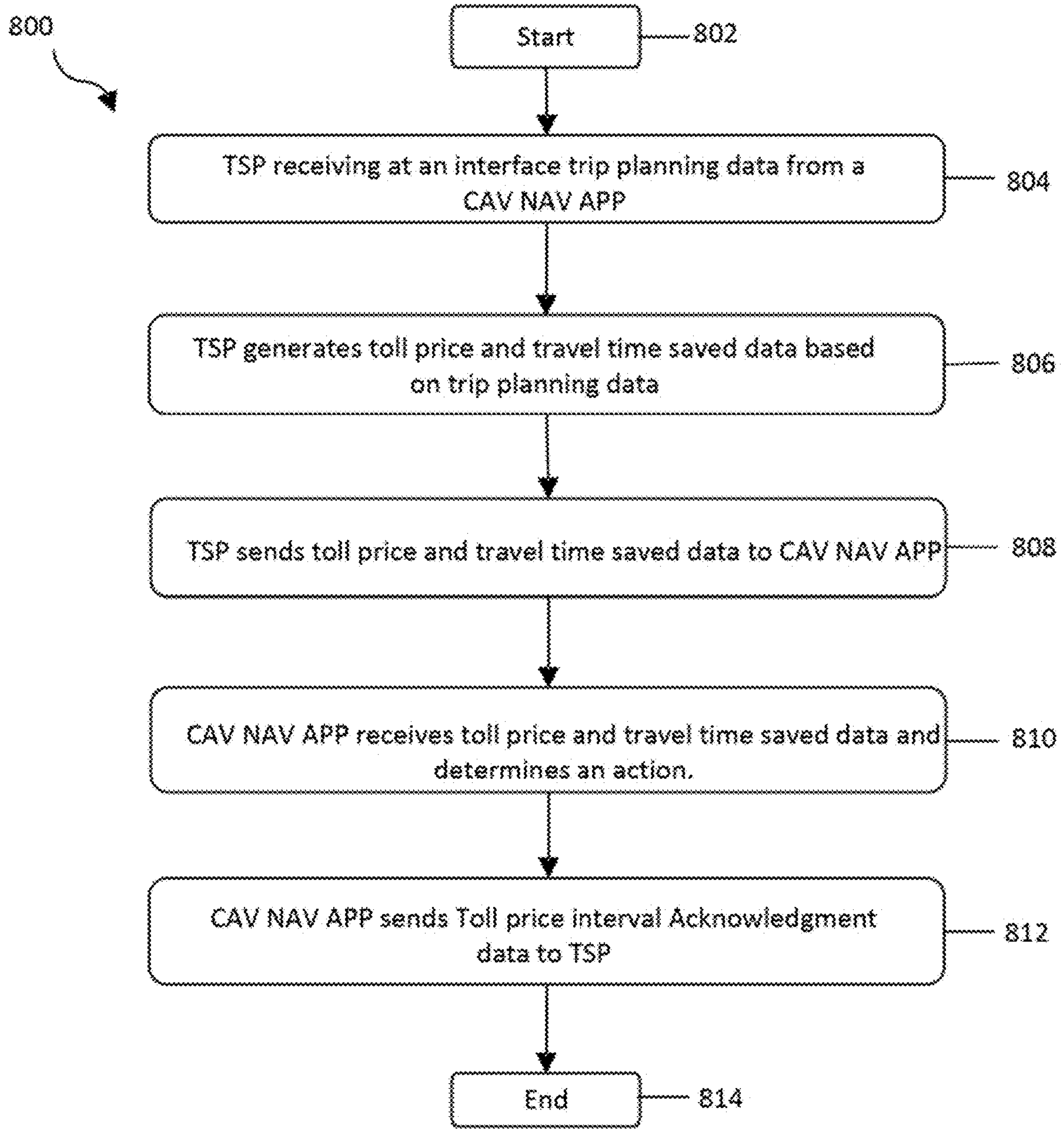
FIG. 8 is a process flow diagram for sharing a toll price interval and travel time saved with a connected-automated vehicle, in accordance with some embodiments.

FIG. 8 is an example process flow for a method for sharing a toll price interval and travel time saved with a CAV. The process visually illustrates many of the process steps described in conjunction with FIG. 7, which may be used as an additional reference in conjunction with FIG. 8. As the process starts at block 802, and at block 804, the TSP receives, at an interface, trip planning data from a CAV. At block 806, the TSP generates toll price interval and travel time saved data based on the Trip Planning data. The travel time saved may be based upon future roadway conditions that the system generates through algorithms designed to accept roadway condition inputs, weather data, event information, historical roadway conditions, among others to predict future roadway conditions in order to determine the travel time saved by using a managed lane in lieu of a general purpose lane.

At block 808, the TSP sends the toll price and the travel time saved to the CAV. AT block 810, the CAV receives the toll price and travel time saved and determines an action, such as whether to accept the toll price and travel time saved, or to reject the toll price and the travel time saved.

At block 812, the CAV sends the toll price acknowledgement (TAck) to the TSP. Once the TAck is sent to the TSP, the process may end at block 814. It should be appreciated that the process may be iterated, such as updating the toll price and/or predicted travel time saved based on changing roadway conditions.

Figure 9:
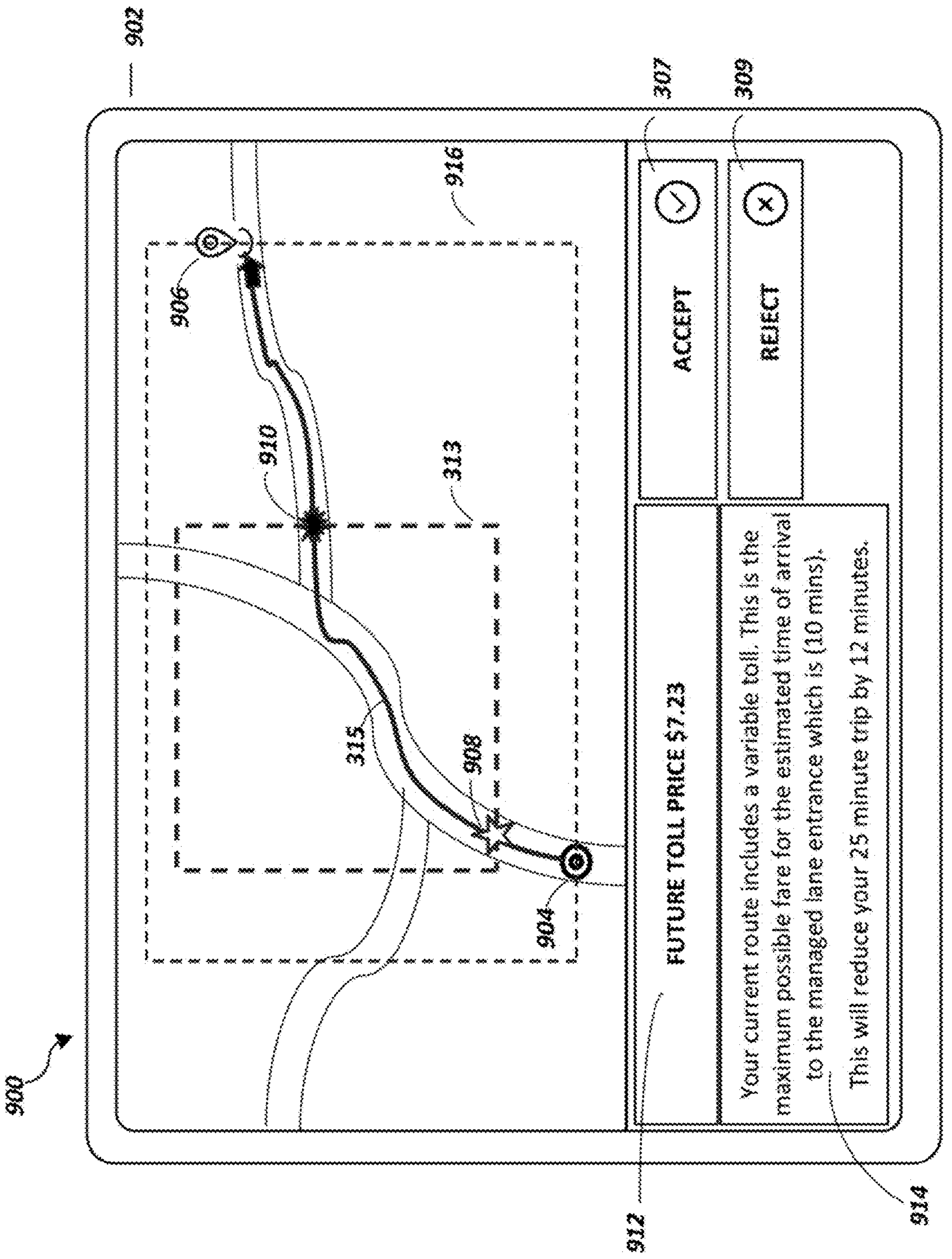
FIG. 9 is an illustrative example of a connected-automated vehicle navigation application display of trip planning information used for receiving toll price intervals and estimated travel time saved, in accordance with some embodiments.

FIG. 9 illustrates an example display 900 from a CAV (i.e., navigation application) showing trip planning information that may be utilized for receiving toll pricing and estimated travel time saved. The display may be shown on any suitable display, which may include, for example, a vehicle in-dash display unit, a smartphone, a mobile computing device, a heads-up display (e.g., such as shown on the windshield or window of the vehicle), smart glasses, or otherwise. In some cases, the display is configured to show integrated toll rate information 902 with CAV systems to provide in-vehicle alerts about current and future traffic conditions and/or toll rates. This ensures that users are aware of toll rates without relying solely on roadside signs. A vehicle current position 904 may be shown to provide context to the driver of the route and the alternative routes with managed and general purpose lanes. The vehicle current position 904 may also be the original point of the CAV for trip planning purposes. As the trip planning commences, the destination 906 may also be displayed, or at least stored by the CAV, especially where the destination is a considerable distance from the origin point 904 and there may be numerous alternate routes between the original and the destination. In some cases, the destination may not be readily viewable on the display 900.

An entry point 908 to the managed lane may be displayed based on the TP data the TSP provided to the CAV. This may also represent the first toll gantry or entrance offered to the CAV. An exit point 910 from the managed lane is provided by the TP data the TSP provided to the CAV. This may also represent a last toll gantry the CAV will enter. In some cases, additional entry points 908 and/or exit points 910 may be displayed, which may be associated with different toll pricing. The entry point 908 and exit point 910 may define a boundary 313 of the area for which the travel time saved is determined. Thus, the travel time saved may be determined only for the roadway 315 within the boundary 313 of a preferred route of the CAV.

A toll price 912 and travel time saved 914 may be determined and shown for the entry point 908 and exit point 910 of the preferred route of the CAV. The total trip time 916 is determined by the navigation application associated with the CAV, which may not be privy to the future toll price or travel time saved. The future toll price 912 and/or the travel time saved 914 may be provided to the CAV from the TSP automatically, or upon request.

The future toll price 912 may be sent by the TSP and displayed in the CAV, such as on any suitable display as described herein.

The CAV determines an estimated time of arrival to the managed lane entry point 908 and also the overall route 916 travel time and identifies the appropriate TSP and pings it for Tpdata. The TSP sends the TPdata to the CAV, which includes the future toll price and the estimated travel time saved by using the managed lane. The CAV may display the future toll price 912 and/or the estimate travel time saved 914. In some cases, a rules-based approach will automatically accept or reject the toll price and may send TAck data to the TSP. In some cases, a prompt is displayed to a driver or occupant of the CAV, such as in a display associated with the CAV, which may be a navigation application display, an audio que and the driver or occupant is able to accept or reject the toll price.

Figure 10:
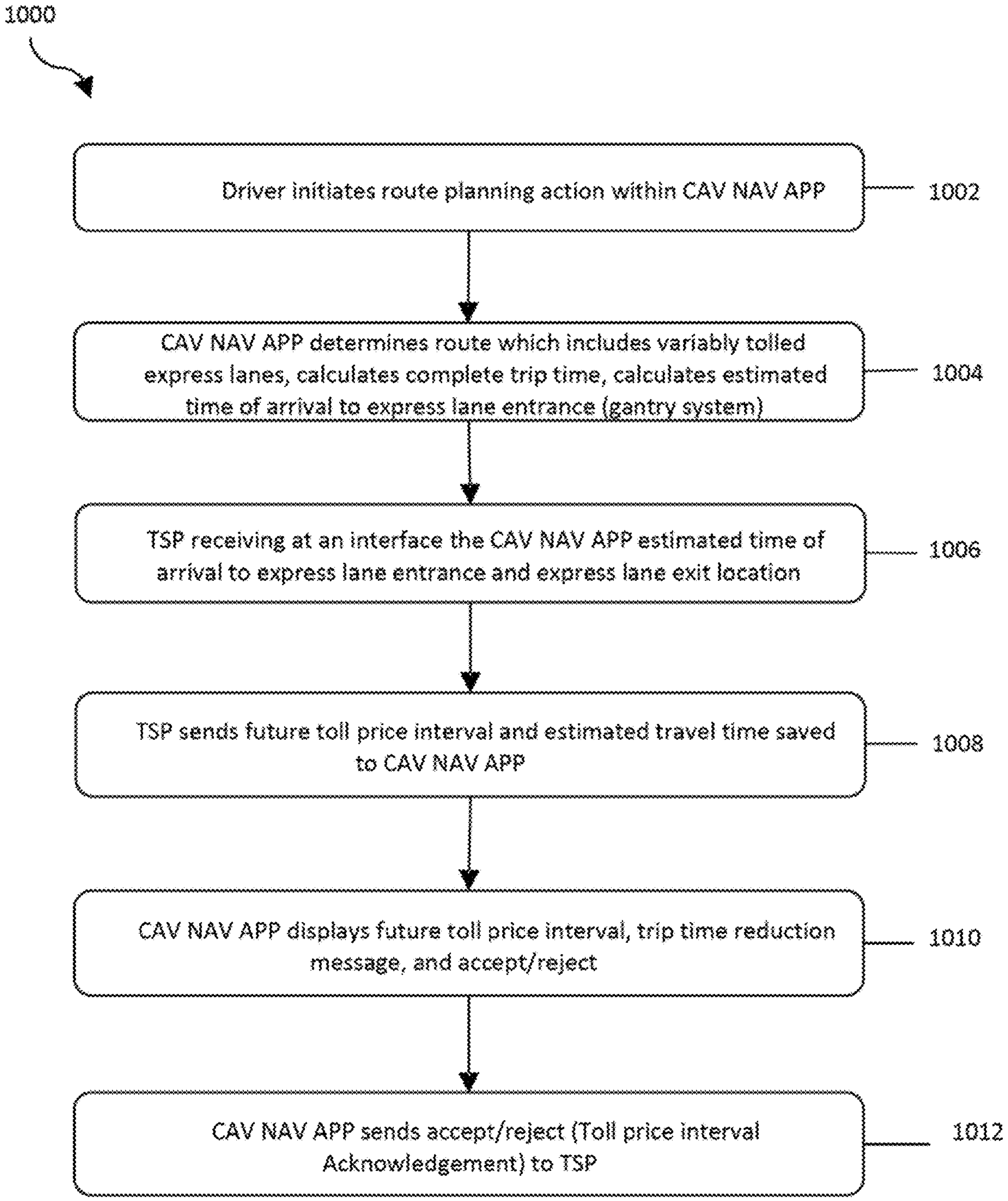
FIG. 10 is a process flow diagram for trip planning by receiving toll price intervals and estimated travel time saved, in accordance with some embodiments.

With additional reference to FIG. 10, which shows an illustrative process flow for trip planning 1000, at block 1002, a driver initiates a route planning action within a CAV. In some cases, this may be performed by identifying a desired destination. At block 1004, the CAV determines a route from the CAV's current location to the specified destination and the route includes a variably tolled managed lane as an option for travel. The CAV further calculates the complete trip time and determines an estimate time of arrival to an entry point to the managed lane. The entry point may be any suitable point, such as, for example, a gantry, a gate, the beginning of a new lane, an entrance ramp onto a toll road, or other type of entry that allows a vehicle to enter the managed lane. At block 1006, the TSP receives, from the CAV, an estimated time of arrival to the managed lane entrance, a managed lane exit location, and may also receive the estimated total trip time.

At block 1008, the TSP determines the future roadway conditions, a future predicted toll price for the managed lane, and an estimated travel time saved. This information is sent by the TSP back to the CAV.

At block 1010, the CAV displays, to an occupant of the CAV, the future toll price, a trip time reduction, and an opportunity to accept or reject the toll. The future toll price may be a not to exceed price in which the future price displayed is the maximum toll price for entry into the managed lane, although the actual price at the time of arrival at the managed lane may be lower than the maximum toll price. In some cases, a toll price interval may be displayed which indicates the highest and lowest price associated with the managed lane at the estimated time of arrival at the managed lane.

At block 1012, the CAV sends an indication of acceptance or rejection (TAck) to the TSP. The TSP may, in turn, use the TAck to further predict future roadway conditions as it will have another data point associated with a specific vehicle and whether that vehicle will be in the managed lane or the general-purpose lane.

Figure 11:
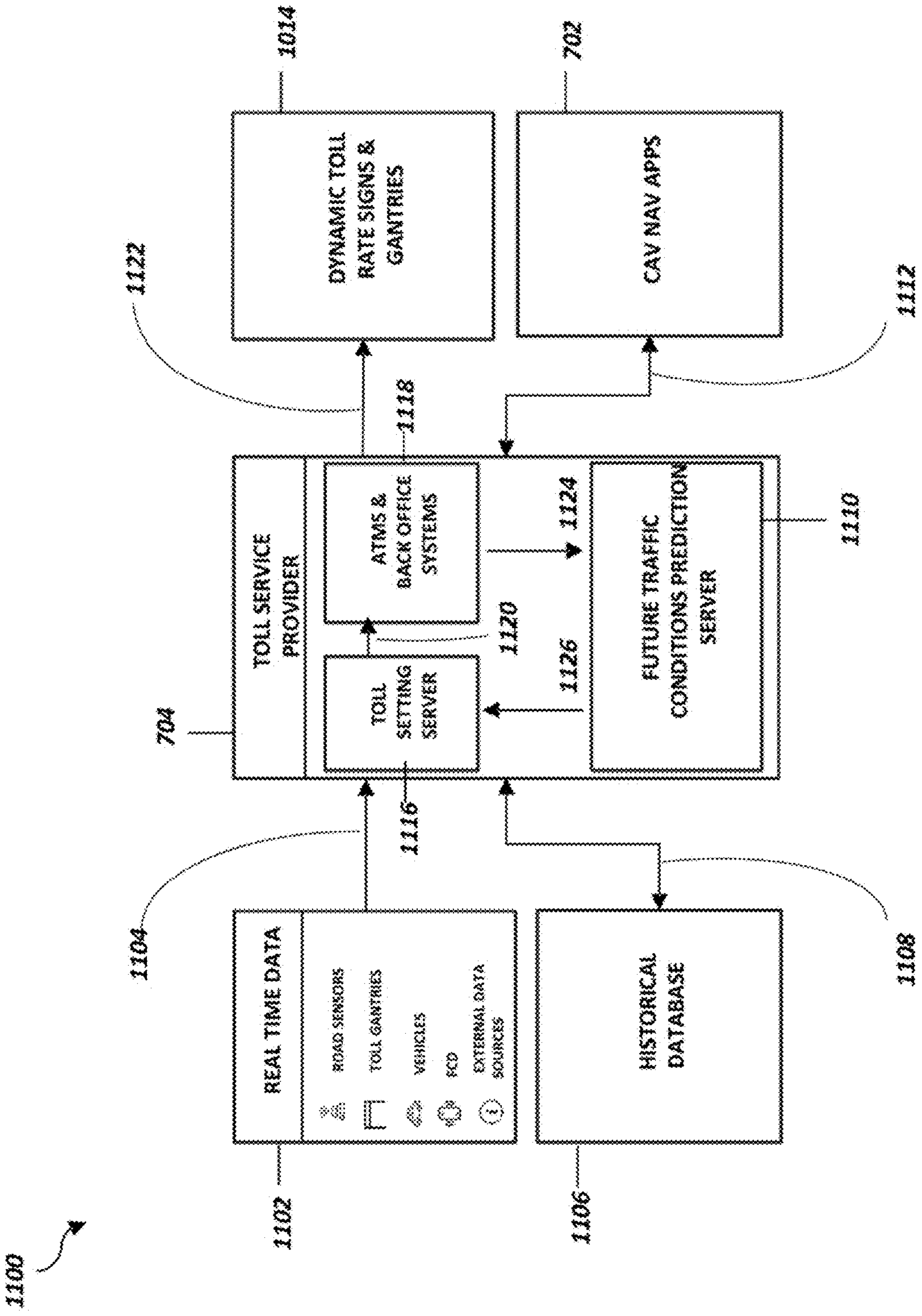
FIG. 11 is a block diagram illustrating systems and a methodology for a toll system that determines and assigns a future toll price interval and determining a travel time saved, in accordance with some embodiments.

FIG. 11 illustrates, in block diagram form, a methodology for a toll system 1100 that determines and assigns a future toll price interval and determining a travel time saved. It should be appreciated the that the system and methods described in relation to FIG. 11 are applicable to, and combinable with, all the various embodiments described herein.

Block 1102 includes real time traffic data, which may include current traffic volumes, speeds, congestion levels, lane occupancy, segment density on both managed lanes and general-purpose lanes, sensors such as radar, cameras, and LiDAR may be used to collect some of this data.

Specialized sensors may be located along the roadway and are configured to send traffic data 1104 to the TSP 704. For example, radar sensors may be used to detect vehicle speed and vehicle volume. They can operate in various weather conditions and provide continuous monitoring of traffic flow and send real-time updates to the TSP. Cameras, which may include closed-circuit television (CCTV), and automatic license plate recognition (ALPR) systems may be used for visual monitoring, incident detection, and may also aid in the enforcement of tolls or lane usage restrictions. In addition, light detection and ranging sensors (LiDAR) can be used to create high-resolution 3D maps of the roadway environment. They may be used for vehicle detection, classification, and tracking while providing detailed information about traffic conditions.

In addition, gantries provided over, adjacent to, under, or on the roadway trigger a toll collection mechanism and can count the number of tolls that are collected for a specified period of time. Furthermore, mobile GPS data can be aggregated such as from CAV's, mobile computing devices, and other such sources, to provide real-time traffic patterns and travel speeds, offering a broad view of traffic conditions beyond those provided by fixed sensors.

In some cases, information on major events, such as sports games, concerts, conventions, parades, and the like can help predict surges or reductions in expected traffic patterns and adjust the estimated travel times, and tolls, accordingly.

Weather monitors and sensors can be used to provide real-time weather information as adverse weather can significantly impact traffic flow and driver behavior. In some cases, sensors and/or monitors provide real-time information on accidents, roadworks, and other traffic-affecting incidents. All of this type of traffic data 1104, which has a tendency to impact traffic flow can be used to predict future traffic patterns and tolls.

The TSP 704 additionally receives important ground truth information from historical records, such as a historical database 1106. Ground truth data, in the context of machine learning, refers to the data that is known to be accurate and reliable, and serves as a benchmark for training and evaluating machine learning models. It is the data that has been directly observed or measured, rather than inferred or predicted.

In supervised learning, in particular, ground truth data is used to train the model by providing it with input features along with their corresponding correct output labels or values. The model learns to map the input features to the correct outputs based on the ground truth data. In many cases, the historical data 1106 The historical database 1106 may include the real time traffic data associated with historical time periods, weather data, event data, travel times, GPS data, among other types of historical traffic data. The historical database 1106 may share and receive information with the future traffic conditions prediction server 1110.

The future traffic conditions prediction server 1110 uses one or more machine learning models to predict future traffic conditions, and in turn, time saved by utilizing managed lanes. In some embodiments, the future traffic conditions prediction server 1110 relies on models that rely on real-time data 1102 from sensors to predict traffic volumes and speeds. They help in understanding how traffic is likely to evolve over several minutes or even longer time periods, such as every fifteen minute increments, or thirty-minute increments, or more. Real-time weather data may be integrated into the prediction models to account for the impact of weather conditions on traffic flow. For example, rain or snow can significantly slow down traffic which entices drivers to choose a managed lane, which may have slow down to a lesser degree than general purpose lanes. Incident detection systems use data from various sources including roadside sensors as well as navigation apps, social media, traffic reports from the three-digit dialing code (511 systems), to detect accidents.

According to some embodiments, various machine learning models can be used by the future traffic conditions prediction server. In predictive modeling, as here, machine learning algorithms analyze historical data to forecast future conditions. The quality and quantity of data can significantly influence model performance, and iterative training on data from the historical database 1106 increases model performance over time. The historical database includes raw data that is preprocessed and cleaned, such as to handle missing values and outliers, normalization or standardization, and encoding categorical variables to convert qualitative data into numerical form. The raw data is transformed into meaningful inputs through feature engineering. Features are created that categorize the data and can be used to reduce dimensionality to remove redundancies and relevant features can be selected to avoid overfitting. Some suitable algorithms used by the future traffic conditions prediction server 1110 include linear regression, decision trees, support vector machines, neural networks, and ensemble methods.

Once the model is trained, it may be evaluated on hold-out or cross validation data sets to assess its performance on unseen data. The model may be trained using supervised learning or unsupervised learning, or both. Supervised learning involves labeled datasets where the model learns from input-output pairs to predict outcomes for new data. Unsupervised learning uses unlabeled data, and the model searches for hidden patterns or groupings.

The trained models utilize the learned patterns from historical data to make accurate predictions about future conditions, such as traffic pattern and time saved data.

An appropriate algorithm is chosen, such as one or more of a suitable classification, regression, clustering, etc. algorithm. The algorithm is trained on the historical data, and the model adjusts its parameters to minimize, or at least reduce, prediction errors.

Other models that can be useful with the future traffic conditions prediction server include: anomaly detection, which include isolation forests, robust covariance, one-class vector support machines, and local outlier factors.

Isolation Forests function by isolating observations by randomly selecting a feature and then randomly selecting a split value between the maximum and minimum values of the selected feature. Anomalies are isolated quickly because they are few and different.

Robust Covariance techniques identify outliers by measuring the distance of data points from the center of a data distribution.

One-Class Support Vector Machines (SVMs) can be used to identify the boundary that best separates normal data points from anomalies.

Local Outlier Factor (LOF) can be used to identify anomalies by comparing the local density of a data point to that of its neighbors.

The future traffic conditions prediction server 1110 may also use one or more clustering algorithms to manage and respond to detected anomalies. For example, k-Means Clustering can be used to partition data into k clusters, where each data point belongs to the cluster with the nearest mean.

Affinity Propagation can be used to identify exemplars among data points and forms clusters based on the similarity between data points.

DBSCAN (Density-Based Spatial Clustering of Applications with Noise) techniques can be used to group together points that are closely packed together, marking points that lie alone in low-density regions as outliers.

The future traffic conditions prediction server 1110 may also rely on predictive modeling techniques to forecast future traffic conditions and make informed decisions.

For example, regression techniques can be used to predict continuous outcomes, such as traffic flow rates or toll prices.

Artificial Neural Networks (ANNs) can be utilized for more complex predictions, such as traffic patterns over time. Specific architectures of ANNs may include one or more of Recurrent Neural Networks (RNNs): Suitable for time-series predictions; and Long Short-Term Memory (LSTM) Networks: A type of RNN that can learn long-term dependencies, useful for predicting traffic conditions based on historical data.

The future traffic conditions prediction server may further rely on Decision-Making Algorithms, such as for setting toll rates and managing traffic and use the output from anomaly detection and clustering.

For example, rule-based Systems can be used to apply predefined rules to adjust toll rates based on detected anomalies, which impact roadway conditions.

Machine Learning Models, such as decision trees or support vector machines, can be used to make decisions based on patterns learned from historical data.

The future traffic conditions prediction server 1110 may further utilize vectorization and feature selection for converting raw traffic data into a format suitable for analysis, including vectorization in which data attributes are transformed into vectors in n-dimensional space. Feature Selection may be used to choose relevant data attributes to reduce dimensionality and improve the efficiency of the algorithms.

In addition, dimensionality reduction techniques may be employed to handle high-dimensional data, including Principal Component Analysis (PCA) which can be used to reduce the number of dimensions by transforming data into a set of orthogonal components. Non-Negative Matrix Factorization (NNMF) may decompose data into non-negative factors for easier interpretation.

Furthermore, Multi-Agent Machine Learning Algorithms (MAML) may involve multiple autonomous agents that work together to solve complex traffic management problems. These agents can be used optimize traffic flow and reduce congestion problems, among other things. For instance, each agent learns and makes decisions independently but also coordinate with each other to achieve a common goal. A common approach in multi-agent systems is reinforcement learning, where agents learn optimal behaviors through trial and error by receiving rewards or penalties based on their actions.

In some example systems, there are higher-level coordination agents that oversee the actions of individual agents. These coordination agents ensure that the overall traffic management strategy is being followed and can override decisions if necessary. Each segment of a highway or express lane can be monitored by individual agents, each responsible for controlling toll prices and other traffic control devices designed to manage traffic flow.

Based on the real-time data collected, each agent can dynamically adjust toll prices for its segment. For example, if an agent detects increasing congestion, and more vehicles entering the express lane it can raise toll prices to discourage additional vehicles from entering, thereby managing traffic flow more effectively.

To ensure smooth traffic flow across the entire express lane, agents can communicate with each other. If one segment becomes congested, neighboring agents can adjust their toll prices to balance the traffic load. This coordination helps prevent severe slowdowns and ensures a more even distribution of vehicles.

As an example, during peak hours, the agent for a particularly busy segment detects heavy traffic entering the express lane. It raises the toll price for that segment to reduce the number of vehicles entering. Neighboring agents, noticing the change, adjust their toll prices to accommodate more or less traffic depending on their location being upstream or downstream from the particularly busy segment.

Route or trip planning information from connected and/or automated vehicles (CAVs) can be integrated into a multi-agent traffic management system to significantly enhance its efficiency. The CAV navigation applications share their route and trip planning information with the higher-level coordination agent. This data includes, among other things, expected arrival times, and their preferred routes. The coordination agent uses this data to predict traffic patterns and managed lane demand.

The higher-level coordination agent aggregates data from a plurality of CAV navigation apps and communicates relevant information to segment-specific agents. This ensures that each segment agent has a comprehensive view of upcoming traffic conditions. Segment-specific agents provide feedback to the coordination agent about the effectiveness of their adjustments. This feedback helps refine the predictive models and improve future traffic management strategies. Agents collaborate to ensure that adjustments in one segment do not negatively impact neighboring segments. For instance, if raising tolls in one segment diverts traffic to another, agents coordinate to balance the traffic load across the entire managed lane network.

CAV navigation apps 702 are configured to continuously collect and transmit data 1112 about their location, speed, and route choices. Additionally, when these vehicles accept future trip data and toll rates, this information can be used to predict future road segments and lane densities. By analyzing historical data on trip and toll acceptance, predictive models can forecast future demand based on current and future traffic conditions and corresponding toll rates. For instance, if a significant number of CAVs accept higher future tolls for managed lanes, it indicates a likely increase in traffic volume on these lanes. This helps in predicting congestion levels and adjusting toll rates dynamically to manage current flows that will impact future traffic flows. Conversely, if fewer CAVs accept the tolls, it could suggest that more vehicles will use general purpose lanes, potentially leading to increased congestion there.

The CAV navigation apps 702 share the trip planning data 1112 with the future traffic conditions prediction server 1110 and receives information from the TSP 704, such as time saved by using the managed lanes and the toll price at the time the CAV will reach the managed lane entry.

In some embodiments, one or more dynamic toll rate signs and/or gantries 1014 can be updated in real-time based on current traffic conditions and predictive data. They are updated frequently to reflect the latest traffic predictions and conditions, providing drivers with the most accurate information. The dynamic toll rate signs and/or gantries 1014 may be controlled by the TSP 704 and may update, in real time, with updated information from the toll setting server 1116.

The toll setting server 1116 uses future and real-time traffic data in making decision about setting specific toll rates in order to manage the level of service along the roadway. The toll setting server 1116 may run a dynamic pricing algorithms that adjusts toll rates based on the traffic condition data. The goal is to manage congestion and maintain a steady flow of traffic to maintain a desired level of service. For example, during peak hours when traffic is heavy, the toll rates increase to maintain a level of service and reduce congestion. Conversely, during off-peak hours, the toll rates decrease as there is little risk that higher usage will impact the level of service. The rates set by the toll setting server 1116 may automatically be sent to the dynamic toll rate signs and/or gantries 1014 in order to update CAVs and drivers.

The TSP 704 further includes an advanced traffic management system (ATMS) and back office systems 1118. The back-office system helps to ensure the efficient operation, management, and oversight of toll collection services. It integrates various processes and supports the various business functions involved in tolling operations. The functionalities of such a system can be broken down into several core categories that include toll transaction processing, account management, data management and reporting, dispute and violation, customer support and communication, integration with other systems, compliance and regulatory, operational management system monitoring, dynamic pricing and discounts, and security and fraud protection among others. These will be discussed in greater detail.

Toll Transaction Processing includes transaction capture and validation. This ensures that all toll transactions (manual or electronic) are accurately captured from various sources (e.g., toll booths, electronic toll collection systems). Validation cross-checks transactions against the registered vehicles and the predefined rules (e.g., valid toll rates, vehicle types, or accounts). Automatic vehicle identification (AVI) integrates with vehicle identification systems (such as RFID or license plate recognition) to automate toll collection.

The account management functions include account creation and maintenance, which allows for the creation and maintenance of user accounts, including both individual and commercial users. Account balance management monitors account balances, processes top-ups or fund transfers, and tracks toll usage against account balances. Payment integration supports multiple payment methods, including credit/debit cards, bank transfers, prepaid accounts, and mobile payments. These payments may be automatically processed as a vehicle enters or exits a managed lane, and the system can provide updates to the registered user of a vehicle through the account managements, which may show day and time of toll, amount of toll, direction of travel, an identification of a specific managed lane, and may include a photograph of the vehicle or license plate at the time of tolling. Billing generates accurate billing for toll charges based on usage, applying any applicable discounts, dynamic pricing, or special toll classifications. Refund processing manages refunds for overcharges, cancellations, or disputes.

The data management and reporting functions to report on daily, weekly, or monthly toll revenues, usage statistics, and transaction volumes. Audit logs maintain logs for auditing purposes, tracking system access, and operational activities. Revenue reconciliation provides functionality for verifying total toll revenues against collected amounts and flags discrepancies for investigation. Data analytics analyzes user behavior, traffic patterns, toll revenue trends, and more for planning and optimization.

The dispute and violation management of the back office systems functions integrally with the tolling infrastructure to identify vehicles that pass through toll points without proper payment. Violation processing manages the issuing and tracking of violation notices (e.g., toll evasion), including correspondence, payment deadlines, and penalties. The dispute resolution functionality provides a platform for users to dispute charges, providing case management features to resolve issues.

The penalty management functionality manages penalties, fines, and enforcement actions, tracking whether a fine has been paid or contested.

Customer support and communication provides tools for customer service representatives to assist users with account issues, toll violations, payment inquiries, and general queries.

Notifications allows the sending of notifications to users regarding low balances, upcoming renewals, toll payment due dates, or violations via email, SMS, or app notifications.

A Portal/Website access provides an online portal or mobile app for users to manage their accounts, view transactions, load funds, and review toll history.

The back office systems may be configured for integration with other systems such as other toll systems, both regionally and internationally, for cross-border or multi-regional tolling. It may also offer third-party integration, such as payment gateways, bank networks, government databases, and vehicle registration systems, among others.

In some cases, the system allows for an external API access so that other systems (like fleet management software, for example) can use to integrate with the tolling back-office system.

The compliance and regulatory reporting function allows compliance with relevant government regulations and standards (such as electronic toll collection requirements, tax reporting, or environmental standards). Tax calculation determines and reports on applicable taxes on toll charges, including VAT, road usage fees, or congestion charges.

The ATMS and back office system further include operational management functionality such as system monitoring which tracks the health and performance of tolling systems, including hardware and software components, ensuring smooth operations. It also provides for maintenance scheduling for the maintenance or upgrades of tolling infrastructure and back-office systems. Resource management manages the deployment of human resources to monitor and support toll collection, such as staffing toll booths, call centers, or violation enforcement teams.

The ATMS and back office system may further be responsible for dynamic pricing and discounts. For example, dynamic pricing models can be based on traffic conditions, time of day, or congestion, adjusting toll rates to optimize flow. The toll rates can be sent not only to dynamic toll rate signs and/or gantries 1014, but may also be sent directly to CAVs where they can be received by CAVs and/or displayed for a driver or vehicle occupant to review and approve.

Discounts and special rates functionality can be used to apply special pricing structures or discounts for specific vehicle types, users (e.g., frequent users, commercial vehicles), or scenarios (e.g., off-peak hours).

The ATMS and back office systems can also be configured for security and fraud prevention. According to some embodiments, fraud detection implements algorithms or machine learning models to detect fraudulent activity, such as toll evasion or account hacking. data encryption ensures secure transmission and storage of sensitive user data, payment information, and transaction records. Access control limits access to the system to authorized personnel, ensuring sensitive data is protected from unauthorized access.

The advanced traffic management system (ATMS) plays an important role in the efficient operation of a tolling facility. For example, ATMS integrate data from various roadside sensors (radar, cameras, LiDAR, etc.) and other sources (floating car data, weather reports) to provide a comprehensive view of traffic conditions and congestion levels.

In some embodiments, current toll rates are generated by the toll setting server 1116 and sent to the ATMS 1118 as shown by arrow 1120. The ATMS, in turn, send the current toll rates to the dynamic toll rate signs and/or gantries 1014, shown by arrow 1122, and to the future traffic conditions prediction server, as shown by arrow 1124, which can use the current tolls to predict future traffic congestion.

The CAV navigation apps 702 send TP data and requests to the future traffic conditions prediction server 1110, which predicts future traffic conditions and sends it to the toll setting server 1116, shown by arrow 1126, which communicates with the ATMS and back office systems 1118, which in turn, sends commands to the dynamic toll rate signs and/or gantries 1014 to modify traffic flow.

The predicted and real-time traffic data is sent back to the historical database 1106, shown by arrow 1108, and stored for later analysis and model iterative training. All the data inputs can correlate to dates, time periods, and other influencing patterns to identify patterns such as rush hours, weekends, and holiday traffic surges. This includes historical data on the number of vehicles and their speeds on both managed and public purpose lanes. Historical toll rates the corresponding traffic volumes and travel time saved for a plurality of routes.

Figure 12:
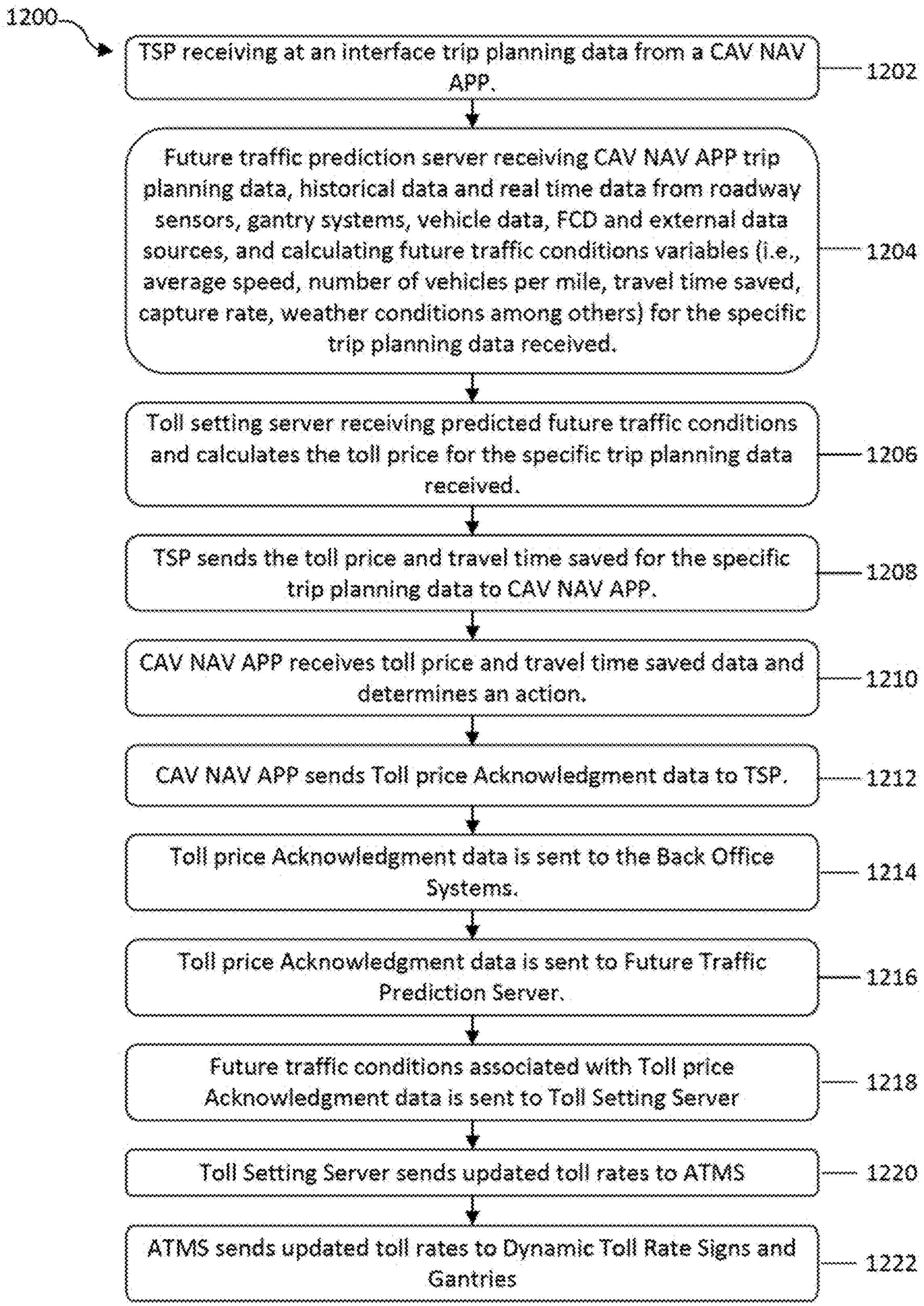
FIG. 12 is a process flow diagram for assigning a future toll price interval and determining travel time saved, in accordance with some embodiments.

FIG. 12 illustrates a process flow for assigning a future toll price interval and determining travel time saved 1200 according to some embodiments. The illustrative process flow describes many of the systems shown in FIG. 11, but it is also applicable to any of the embodiments described herein.

At block 1202, the TSP receives trip planning data from a CAV. The trip planning data includes the TP data described herein, which may include one or more of a starting point, a destination, a route, the route containing a managed lane and a general-purpose lane, an entry point to the managed lane, an exit point from the managed lane, and a time to reach the entry point.

At block 1204, the future traffic prediction server receives the TP data, and retrieves historical data, and real-time data from roadway sensors, gantry systems, vehicle data, FCD and external data sources, and determines, through a trained machine learning model, predicted future traffic conditions. The predicted future traffic conditions include one or more of average vehicle speed, number of vehicles per mile (density), travel time saved, capture rate, weather conditions, among others. In addition, based on the future traffic predicted, the future traffic prediction server will also determine the time difference between the route planning received from the CAV for the general-purpose lane and if the CAV were to use the managed lane, to thereby determine a travel time saved for the specific route by using the managed lane.

At block 1206, the toll setting server receives predicted future traffic conditions from the future traffic condition prediction server and the travel time saved, and determines the toll price for the specific trip planning data received. The determined toll price is based largely on an expected level of service for the roadway and in an effort to ease congestion. For example, if the traffic on the roadway is slow because of congestion and the managed lane is relatively empty, the toll setting server may reduce the toll for the managed lane to encourage more drivers to use the managed lane. If, however, the managed lane becomes busy and traffic in the lane slows, then the toll setting server may increase the price thereby reducing the likely number of vehicles opting for the managed lane.

At block 1208, the TSP sends the toll price and travel time saved for the specific trip planning data to the CAV. At block 1210, the CAV receives the toll price and travel time saved and determines an action. As will be appreciated, in some cases the toll price and travel time saved may be displayed for the driver or an occupant of the vehicle to review and either accept or reject. However, in some cases, the toll price and travel time saved may be decided by the CAV without immediate input from a vehicle occupant. In some cases, the CAV is an autonomous vehicle and it decides whether to accept or reject the managed lane entry based on the toll price and the travel time saved.

At block 1212, the CAV sends the Toll price Acknowledgment (TAck) data back to the TSP. As described elsewhere herein, the CAV communicates with the TSP through any suitable electronic communication protocol, such as, without limitation, cellular, wifi, cellular vehicle to everything networks (C-V2X), vehicle to everything (V2X)(such as vehicle to vehicle (V2V), vehicle to infrastructure (V2I), or vehicle to network (V2N)), or some other suitable wireless or satellite communication technology.

At block 1214 the TAck data is sent to the back office systems which may then automatically process payment, log the capture, among other activities.

At block 1216 the TAck data is sent to the future traffic prediction server, which uses this new information to iteratively predict future traffic conditions based at least in part upon whether or not the vehicle has accepted or rejected the managed lane.

At block 1218, the future traffic conditions associated with the TAck data is sent to the toll setting server, which in turn, may use this updated future traffic conditions to adjust a toll either up or down to incentivize more CAVs to enter or avoid the managed lane in order to maintain a level of service of the roadway.

At block 1220, the toll setting server sends updated toll rates to the ATMS, and then at block 1222, the ATMS send updated toll rates to dynamic toll rate signs and/or gantries.

The result of the disclosed systems and processes are machine learning models that can process and analyze large, complex traffic datasets in real-time, far beyond what human operators could ever achieve. This ability allows for immediate adjustments in toll rates to smooth traffic flow. Moreover, adjusting toll rates based on predictive models with additional insights from communication with CAVs, the system improves the overall utilization and service level of managed lanes as well as nearby roadways. This results in reduced congestion and enhanced travel time reliability, which directly improves the infrastructure's performance and capacity. The machine learning models improve the efficiency of traffic data processing, enabling rapid adjustments in toll rates based on current and predicted traffic patterns. This is a dramatic improvement over conventional traffic management systems, which typically lack real-time, predictive control.

In addition, the disclosed systems and methods automate the setting of toll rates based on future predictions, which is a technical advancement over traditional static or manually adjusted toll rates. The machine learning based system uses technical data analysis to decide optimal toll rates automatically, which a technically more sophisticated than simple threshold-based adjustments and further allow real-time decision by continuously adjusting incentives for managed lane utilization in response to predicted congestion levels. This type of process requires both rapid computation and specific decision algorithms that would otherwise be impossible to implement manually.

The disclosed systems and methods continually learn and improve over time through iterative training and thereby adapt to evolving traffic patterns, weather conditions, or event-based spikes in traffic. This adaptive learning characteristic is a technical improvement to traffic science and enables the system to dynamically refine its predictive accuracy and response rate, resulting in improved traffic flow and roadway service levels. Moreover, as connected-automated vehicles become more prevalent, the disclosed system provides a methodology for communication with, guiding, and maintaining high throughput services levels on roadways, especially where connected-automated vehicles and conventional vehicles are sharing the roadways.

By optimizing traffic flow and distributing roadway usage more evenly, the system may reduce wear and tear on infrastructure, resulting in technical improvements in road longevity and reduced maintenance costs. The system further integrates diverse data sources into a unified predictive model, which is an improvement in the way toll systems interact with and leverage roadway sensor networks.

The culmination of the systems and methods described herein result in an improved driver experience by reducing congestion and increasing predictability of travel times and also provides timely feedback to drivers and connected-automated vehicles alike, which is a technical improvement in user-device interaction within the tolling system.

In prior systems, static or manually adjustable toll systems fail to meet the demands of real-time dynamic traffic management. The systems described herein utilize advanced machine learning models that provide adaptive learning, integration with internet of things (IoT), and predictive analytics that fundamentally improve the traffic management systems.

Figure 13:
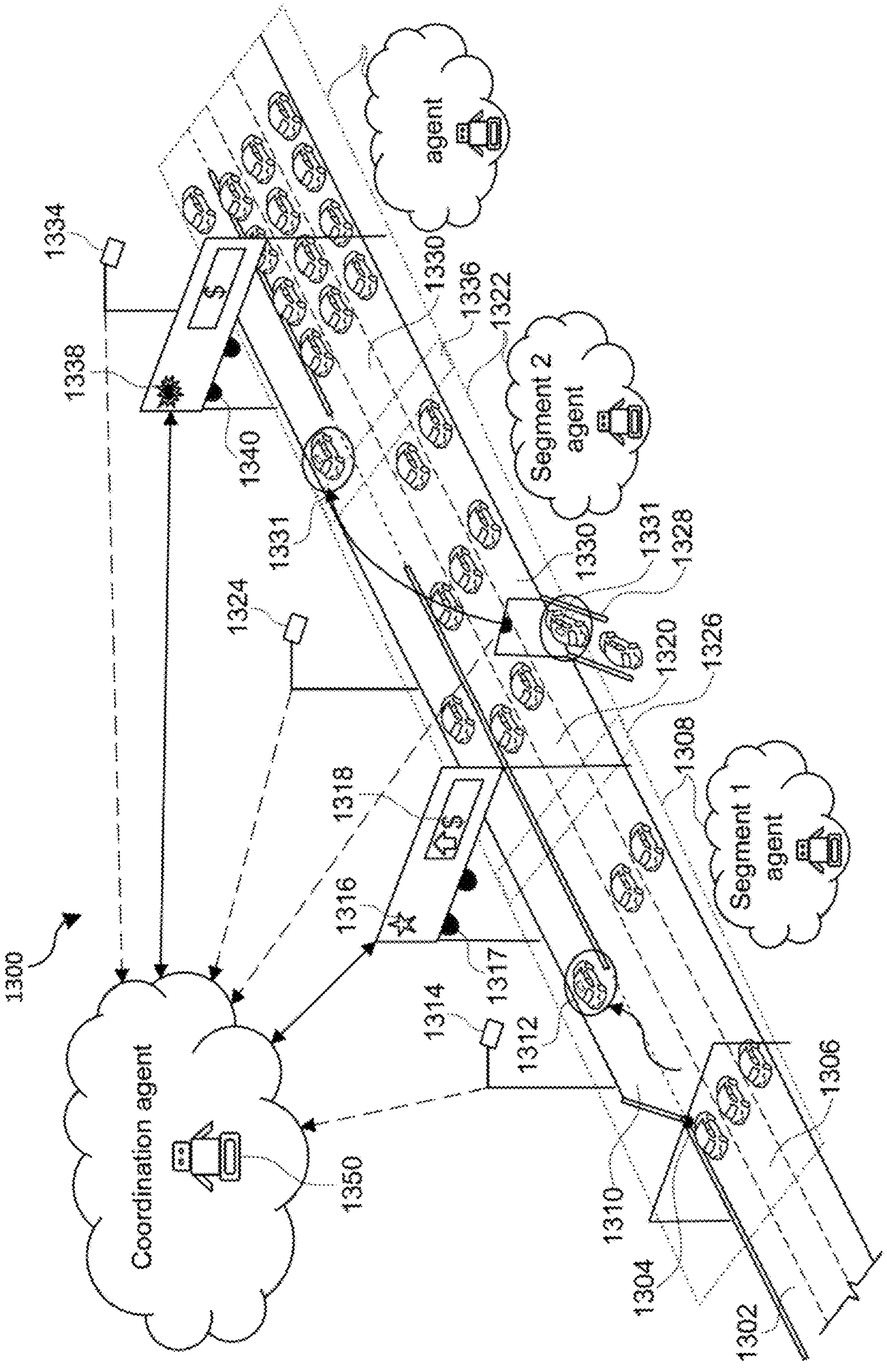
FIG. 13 illustrates a multi-agent reinforced machine learning system that monitors segments of a roadway to maximize throughput, in accordance with some embodiments.

FIG. 13 illustrates a multi-agent reinforced machine learning system 1300 that monitors segments of a roadway to maximize throughput. A roadway 1302 has a plurality of lanes and is divided into two or more segments. An entry point to a first segment 1306 of the roadway 1302 may be monitored by one or more sensors 1304. The sensors may monitor all lanes and may measure roadway density, vehicle volumes and speeds. These data points may determine the travel time in the general purpose lanes which determines the travel time saved for using the managed lane.

Accurate data collection on highways requires reliable and well-maintained sensors. Issues like sensor malfunctions, calibration errors, or data transmission problems can lead to inaccurate density measurements. In some cases, backup sensors are provided for verification and validation of the measurements from the primary sensors.

This method assumes a relatively uniform flow of traffic, which is often not the case on highways. Traffic can be influenced by external factors like toll booths, weigh stations, bottlenecks, leading to non-uniform flow patterns.

By locating sensors 1304 along the roadway, an accurate determination of vehicle volume and density is possible. In some cases, the sensors 1304 are configured to identify individual CAV's or accounts associated with individual drivers. The sensors may be placed adjacent to the roadway, within the roadway, or above the roadway, such as by positioning the sensors on a gantry that extends over the roadway. Suitable sensors include, for example, mmWave radar detectors, automatic license plate recognition (ALPR) cameras, RFID tag readers, and Bluetooth readers.

As vehicles proceed along the roadway 1302, they pass through an entrance into a managed section 1306, and the vehicles may be quantified, and their speed measured, among other things. The first managed section 1306 may include a segment 1 agent 1308 that has responsibility for traffic detection and communication coverage for the first managed section 1306 of the roadway.

Along the first section of roadway 1306, a managed lane 1310 may begin and one or more vehicles 1312 may enter the managed lane 1310. A first node 1314 associated with the first managed section 1306 of the roadway may be configured with AI enabled smart cameras that capture images and/or video in the visible and/or IR spectrum of light, LiDAR, mmWave radar, Bluetooth readers, inductive loops, and communication devices such as ultra small cells, CV2X roadside unit (RSU), among others.

In particular, a CV2X RSU facilitates direct communication between vehicles and infrastructure to enhance road safety and traffic efficiency. This communication protocol allows both direct communication and network-based communications, providing low-latency and high-reliability interactions. In some embodiments, CV2X RSUs are fixed communication devices installed along the roadway, such as on traffic signals, sign posts, poles, gantries, or the like. These units serve as intermediaries between vehicles and the broader traffic management system. Their functions include broadcasting safety messages, facilitating vehicle coordination, and data collection and analysis. The segment 1 agent 1308 utilizes the node 1314 to collect and transmit data associated with the first managed section 1306 of roadway.

As a vehicle 1312 enters the managed lane 1310, it passes through a first gantry 1316. The first gantry 1316 is configured with one or more sensors 1317 configured to detect and identify vehicles, including connected-automated vehicles. These include Automatic License Plate Readers (ALPR), 2-D Laser curtains for profiling the vehicle size, RFID toll tag readers, and other cameras to detect make and model or number of axles. It can also include communication devices to the vehicle including designated short-range communications or cellular V2X technology, and in some cases, can determine a number of occupants in the vehicle. The gantry may also display some human-readable indicia 1318 that may include one or more of an open/closed indication, a time of permissible lane usage, lane usage restrictions, a price for lane usage, among other things. Of course, this same indicia may be provided directly to connected-automated vehicles or CAV's in general through wireless digital communication means, as described herein.

After passing through a first gantry 1316, the vehicle 1312 may enter a second managed segment 1320. The second managed segment 1320 may be associated with a segment 2 agent 1322 that is associated with a second node 1324. The segment 2 agent 1322 may provide detection and communication coverage, and onramp detection, among other things for the second managed segment 1320 and may have some geographic overlap 1326 with the first managed segment. The second node 1324 may be similar to the first node 1314 and may have correspondingly similar sensor and communication capabilities.

An on ramp 1328 may be configured with sensors 1333 to monitor the on ramp 1328 to the general-purpose lanes of the second segment 1320 of the roadway. As with other sensors along the roadway, these may include mmWave radar detectors, ALPR cameras, RFID tag readers, and Bluetooth readers such as to identify the CAV. The on ramp 1328 may have a gantry or some other mounting point for the sensors 1333, which communicate with the segment 2 agent 1322. As a CAV 1331 travels on the on ramp 1328 onto the general-purpose lanes, the segment 2 agent 1322 adds this vehicle count to the total vehicle count on the roadway. If the vehicle then proceeds to enter the managed lane 1310, it can be determined, such as by another gantry in the downstream roadway segment.

After passing through the second managed segment 1320, a vehicle may enter a third managed segment 1330. The third managed segment 1330 may be associated with a segment 3 agent 1332 that is associated with a third node 1334. The segment 3 agent may provide detection and communication coverage, onramp detection, among other things for the third managed segment 1330 and may have some geographic overlap 1336 with the second managed segment 1320. The third node 1334 may be similar to the first node 1314 and may have correspondingly similar sensor and communication capabilities.

The third segment 1330 may include a second gantry 1338 which may be associated with an exit point from the managed lane 1310. The second gantry 1338 may include one or more sensors 1340 such as those described in conjunction with other gantries described herein. The second gantry 1338 can further detect that additional vehicles have entered the managed lane 1310, such as by comparing a time-wise vehicle count with a similar count from an upstream gantry system. The second gantry 1338 may also be a last gantry along the managed lane 1310 and can send data, through the segment 3 agent 1332 associated with billing an appropriate account for use of the managed lane 1310.

In some cases, the segment 1 agent 1308, the segment 2 agent 1322, and the segment 3 agent 1332 all communicate with a coordination agent 1350. The coordination agent 1350 may sit at the highest level of the system, be responsible for the entire roadway asset, and communicate with each agent along the roadway 1302. The system is thus configured to monitor each segment of the roadway, including any on or off ramps, managed lanes, and can determine the volume, density, and speed of the traffic on the roadway.

By monitoring all entry and exit points of the facility each agent can detect the presence of registered CAVs through their account details such as a toll tag, license plate, mac address, etc. The segment agents can share this information with the coordination agent for future traffic conditions prediction. For example, the coordination agent 1350 can learn patterns or preferences of CAVs under various traffic conditions, and the correlating toll prices and travel time saved (what did the CAV accept/reject under certain conditions). In addition, it can learn what discounts or incentives the CAV has a propensity to accept and ones it rejects and can tailor it to be more effective in future offerings that meet the objectives of the coordination agent. In some embodiments, the segment agents can offer discounts or incentives to individual CAVs based on prior behaviors and history. In some cases, the coordination agent can override individual decisions of each segment agent and can send instructions for segment agents to follow. For example, the coordination agent may have upstream information indicating that an emergency vehicle will soon be entering the first managed section 1306 and each segment agent can control traffic ingress and egress accordingly. Similar, in the case of an accident or first responders on scene, the coordination agent 1350 can issue instructions to each segment agent to manage traffic to increase first responder safety during an incident.

As a further practical example, a tolled expressway with multiple segments may be each monitored by its own agent. CAVs planning to travel on this express lane share their route plans with the coordination agent 1350. The coordination agent 1350 predicts a high volume of traffic in Segment 3 1330 during the morning rush hour which will correlate to a higher capture rate for the managed lane 1310. It informs the Segment 1 agent 1308, which raises toll prices to manage the capture rate flow. Throughout this process, agents continuously share data and feedback to optimize overall traffic flow.

The integration of CAV data into a multi-agent system allows for a more responsive and efficient traffic management approach, leveraging real-time information to make proactive adjustments. This has the effect of smoothing and optimizing traffic flow, increasing predictability in travel times, and managed lane capture rates.

For example, the CAV 1331 could request toll prices and travel time saved for multiple routes such as entering the through segment 1 or 2. The multi-agent monitoring system coordinates across multiple agents/segments to identify the optimal path based on the CAV's estimated time of arrival for each route. Based on CAV information and information from the Segment 3 Agent 1332, the Segment 2 Agent 1322 warns that based on their time of arrival the agent will likely be initiating ramp metering to smooth traffic flow to reduce stop-and-go conditions, create better utilization of road space that will allow more vehicles to switch lanes and access the express lane if so desired. However, this will increase the dwelling time to access the facility increasing the travel time for the CAV 1331, but this is also the last access point to the express lane 1310 which will also have a lower price than Segment 1 to access the express lane. The Segment 1 Agent 1308 does not have ramp metering as it directly connects to a free highway however because the Segment 3 Agent 1332 is anticipating congestion it informs the Coordination Agent that it anticipates these traffic conditions and will instruct Agent 1 1008 to raise the toll price by the time the CAV arrives; however accessing the express lane at this location will avoid the possibility of dwelling at a ramp meter and increase the travel time saved.

In some instances, the multi-agent reinforced learning system described may override what it would normally do in order to influence speed, harmonization of traffic, and decisions of the CAV. For example, the multi-agent reinforced learning system may provide additional, or alternative, types of incentives to induvial CAVs that may be different from what the CAV originally requested. The system may determine that a CAV rejects certain prices, during certain times of the day or week. If the future traffic conditions predictions indicate the managed lanes will have excess capacity at the CAVs arrival time to the managed lanes the system may then provide a discount to encourage the CAV to take the managed lane. As a further example, the system may may provide other benefits to the CAV to encourage managed lane usage, such as, for example loyalty reward points that can be redeemed for discounts on future trips or partnership discounts, to name a few.

The result of the above-described embodiments results in a system that uses real-time traffic data and communication with CAVs (including connected-automated vehicles), and using trained machine learning algorithms, to predict future traffic conditions and deploy traffic optimization strategies in order to smooth traffic flow, reduce congestion, increase the predictability in travel times, and reduce environmental impacts from traffic inefficiencies. The system thus knows where each CAV is coming from, its route of travel, where it's going, and whether it accepted the manage lane, which thus enables the reinforced learning systems described herein.

While some of the preferred embodiments have been described, it will be understood that those skilled in the art, both now and in the future, may make various improvements and enhancements which fall within the scope of the claims which follow. Moreover, while the various embodiments are described in relation to the various figures, the figures, in some instances, all relate to the same embodiment. In other words, the various figures and accompanying disclosure can be used in various combinations to result in one or more embodiments. These claims should be construed to maintain the proper protection for the invention first described.

What is claimed is:

1. A traffic optimization system, comprising:

a plurality of real-time roadway sensors including one or more of lidar sensors, radar sensors, infrared sensors, microwave sensors, optical sensors, and doppler sensors, the plurality of real-time roadway sensors disposed along a roadway having a plurality of segments, each segment having a managed lane and a non-managed lane, wherein the plurality of real-time roadway sensors are configured to determine real-time traffic data comprising vehicle count, vehicle speed, vehicle volume, and vehicle density associated with each of the plurality of segments;

a traffic database storing historical traffic data for the plurality of segments of the roadway;

a network interface configured to receive a route request from a connected-automated vehicle, the route request including a starting point, a destination, a route along the roadway from the starting point to the destination, and an estimated time of arrival at an entry point of the managed lane;

a future traffic conditions prediction server comprising a memory and a processor executing instructions stored in the memory, the instructions causing the processor to:

receive, via the network interface, the route request from the connected-automated vehicle;

retrieve, from the traffic database, historical traffic data associated with the route at the estimated time of arrival at the entry point of the managed lane;

receive historical traffic data for the plurality of segments of the roadway, the historical traffic data including traffic speed, traffic density, and managed lane acceptance data;

vectorize the historical traffic data into a plurality of vectors, each vector corresponding to a single time interval for one of the plurality of segments;

identify anomalous vectors within the plurality of vectors using an isolation forest anomaly detection algorithm, wherein each anomalous vector represents a time interval where traffic conditions significantly deviate from normal conditions;

cluster the anomalous vectors into a plurality of anomalous vector clusters using a clustering algorithm, wherein each anomalous vector cluster represents a group of similar anomalous traffic conditions;

receive, from the plurality of real-time roadway sensors, real-time traffic data for the route;

input the historical traffic data, the real-time traffic data, and the estimated time of arrival into a machine learning model trained on historical patterns to predict future traffic conditions;

predict, using the machine learning model, an estimated travel time for the managed lane and the non-managed lane along the route at the estimated time of arrival;

determine, based on the estimated travel times, a time savings for traveling in the managed lane;

transmit, via the network interface, the estimated travel time for the managed lane, the estimated travel time for the non-managed lane, and the time savings to the connected-automated vehicle;

receive, via the network interface, an acceptance from the connected-automated vehicle to travel in the managed lane;

update the machine learning model with the acceptance from the connected-automated vehicle; and predict, using the updated machine learning model, future estimated travel times for additional connected-automated vehicles;

a plurality of segment agents, each segment agent associated with one of the plurality of roadway segments, wherein each segment agent is configured to monitor real-time traffic data from roadway sensors in its associated roadway segment and communicate the real-time traffic data to the future traffic conditions prediction server; and a coordination agent in communication with each of the plurality of segment agents, the coordination agent configured to generate and transmit instructions to each segment agent to control traffic flow in the managed and non-managed lanes based on the predicted future estimated travel times from the future traffic conditions prediction server.

2. The traffic optimization system of claim 1, wherein the instructions further cause the processor to:

determine, for each anomalous vector cluster, an anomaly type based on the traffic conditions represented by the vectors in the cluster; and associate an adjustment factor with each anomaly type, the adjustment factor indicating how to adjust the estimated travel times predicted by the machine learning model when the real-time traffic data matches that anomaly type.

3. The traffic optimization system of claim 2, wherein the instructions further cause the processor to:

vectorize the real-time traffic data received from the plurality of real-time roadway sensors into a real-time traffic vector;

compare the real-time traffic vector to each of the anomalous vector clusters to determine if the real-time traffic data is anomalous;

if the real-time traffic vector is anomalous, identify the anomaly type based on a matching anomalous vector cluster; and adjust the estimated travel times predicted by the machine learning model using the adjustment factor associated with the identified anomaly type prior to transmitting the estimated travel times to the connected-automated vehicle.

4. The traffic optimization system of claim 1, wherein the future traffic conditions prediction server is further configured to:

receive, via the network interface, actual travel time data from each connected-automated vehicle that accepted travel in a managed lane;

compare the actual travel time data to the predicted estimated travel times; and further update the machine learning model based on the comparison to improve future predictions.

5. The traffic optimization system of claim 1, wherein each segment agent is further configured to:

store historical acceptance data for connected-automated vehicles that have traveled through a roadway segment associated with the agent;

analyze the historical acceptance data to identify patterns of managed lane usage by individual connected-automated vehicles; and generate targeted incentives for transmission to the individual connected-automated vehicles based on the identified patterns to further encourage managed lane usage.

6. The traffic optimization system of claim 5, wherein the targeted incentives are customized based on factors including one or more of a connected-automated vehicle's historical managed lane usage frequency, time of day, day of week, holiday designation, vehicle occupancy, or vehicle type.

7. The traffic optimization system of claim 1, wherein the future traffic conditions prediction server is further configured to:

receive, via the network interface, navigation data from the connected-automated vehicle indicating a change in the connected-automated vehicle's route after accepting travel in the managed lane; and further update the machine learning model based on the navigation data to improve future predictions.

8. The traffic optimization system of claim 1, wherein the coordination agent is further configured to:

monitor real-time and historical managed lane usage data across all the roadway segments; and dynamically adjust the instructions transmitted to one or more of the segment agents based on the real-time and historical managed lane usage data to balance managed lane usage across the plurality of roadway segments.

9. The traffic optimization system of claim 1, further comprising an on ramp to a first section of roadway, the on ramp including one or more sensors including one or more of radar detectors, automatic license plate readers, radio-frequency identification (RFID) tag readers, and Bluetooth readers, the one or more sensors configured to determine a number of vehicles entering the first section of roadway by the on ramp and sending, to the future traffic predictions server, the number of vehicles entering the first section of roadway.

10. The traffic optimization system of claim 1, wherein the instructions further cause the future traffic conditions prediction server to:

identify connected-automated vehicles that inconsistently accept and use the managed lanes;

categorize the identified connected-automated vehicles as infrequent users; and transmit, via a network interface, incentives to the infrequent users, the incentives including one or more of guaranteed minimum travel time savings, personalized route recommendations, or partner discounts.

* * * * *